(12) United States Patent
Chen

(10) Patent No.: US 12,034,998 B2
(45) Date of Patent: Jul. 9, 2024

(54) VIEWPORT DISPLAY METHOD AND DISPLAY APPARATUS

(71) Applicants: VIDAA USA, INC., Suwanee, GA (US); VIDAA (NETHERLANDS) INTERNATIONAL HOLDINGS B.V., RZ Duiven (NL)

(72) Inventor: Vanjoe Chen, Qingdao (CN)

(73) Assignees: VIDAA USA, INC., Suwanee, GA (US); VIDAA (NETHERLANDS) INTERNATIONAL HOLDINGS B.V., RZ Duiven (NL)

( * ) Notice: Subject to any disclaimer, the term of this patent is extended or adjusted under 35 U.S.C. 154(b) by 28 days.

(21) Appl. No.: 18/065,948

(22) Filed: Dec. 14, 2022

(65) Prior Publication Data

US 2023/0110323 A1   Apr. 13, 2023

Related U.S. Application Data

(63) Continuation of application No. PCT/US2021/054422, filed on Oct. 11, 2021.

(30) Foreign Application Priority Data

Oct. 10, 2020  (CN) .......................... 202011077578.9
Oct. 10, 2020  (CN) .......................... 202011080564.2
Oct. 30, 2020  (CN) .......................... 202011188337.1

(51) Int. Cl.
*H04N 21/431*  (2011.01)
*H04N 21/422*  (2011.01)

(52) U.S. Cl.
CPC ... *H04N 21/4312* (2013.01); *H04N 21/42204* (2013.01)

(58) Field of Classification Search
None
See application file for complete search history.

(56) References Cited

U.S. PATENT DOCUMENTS 10,452,758 B1   10/2019  Bhowmick
2004/0233238 A1 * 11/2004  Lahdesmaki ...... H04N 21/4622
715/810

(Continued)

FOREIGN PATENT DOCUMENTS

CN   105630902 A   6/2016
CN   108307222 A   7/2018

(Continued)

OTHER PUBLICATIONS

International Search Report, mailed Feb. 3, 2022, from PCT/US2021/054422.

(Continued)

*Primary Examiner* — William J Kim
(74) *Attorney, Agent, or Firm* — Workman Nydegger

(57) ABSTRACT

Disclosed is a viewport display method and display apparatus. The method includes: receiving a user operation for continuously moving out of a viewport by causing a selector position on a boundary element of the viewport; determining first element numbers that correspond to elements in a virtual list in which the boundary element is located according to the user operation; determining second element numbers that correspond to to-be-displayed elements on the virtual list according to the first element numbers and the direction of the selector moving out of the viewport; sorting the second element numbers; updating a virtual list rendered by the elements that correspond to the first element numbers by utilizing the sorted second element numbers; and controlling total elements in the updated virtual list to be displayed in the viewport.

14 Claims, 20 Drawing Sheets

(56) References Cited

U.S. PATENT DOCUMENTS

| | | | |
|---|---|---|---|
| 2004/0233239 A1* | 11/2004 | Lahdesmaki | H04N 21/47 715/810 |
| 2005/0257166 A1* | 11/2005 | Tu | G06F 3/0485 715/786 |
| 2007/0139443 A1* | 6/2007 | Marks | H04N 21/4331 |
| 2009/0064055 A1* | 3/2009 | Chaudhri | G06F 3/04883 715/863 |
| 2011/0093888 A1 | 4/2011 | Araki et al. | |
| 2011/0145737 A1* | 6/2011 | Laugwitz | G06F 3/0482 715/763 |
| 2012/0120316 A1* | 5/2012 | Lee | H04N 21/4751 348/E5.103 |
| 2012/0144333 A1* | 6/2012 | Shatalin | G06F 3/0485 715/771 |
| 2013/0181976 A1 | 7/2013 | Dastmalchi et al. | |
| 2015/0317049 A1 | 11/2015 | Miura et al. | |
| 2015/0331562 A1 | 11/2015 | Chaudhri et al. | |
| 2018/0143746 A1* | 5/2018 | Stern | H04L 67/535 |

FOREIGN PATENT DOCUMENTS

| | | |
|---|---|---|
| CN | 108965980 A | 12/2018 |
| CN | 109828802 A | 5/2019 |
| CN | 110134308 A | 8/2019 |
| CN | 110609729 A | 12/2019 |
| CN | 111491196 A | 8/2020 |
| CN | 111698557 A | 9/2020 |
| KR | 10-2007-0007901 A | 1/2007 |
| WO | 2014177929 A2 | 11/2014 |

OTHER PUBLICATIONS

Chinese Office Action, mailed Feb. 9, 2022, from Chinese App. No. 202011077578.9.

Chinese Office Action, mailed Sep. 22, 2022, from Chinese App. No. 202011188337.1.

Chinese Office Action, mailed Apr. 1, 2022, from Chinese App. No. 202011188337.1.

* cited by examiner

Images are planar media consisting of graphics, pictures, etc.

Detail description about the images: XXXXXX

Detail description about the images: XXXXXX

VIEWPORT DISPLAY METHOD AND DISPLAY APPARATUS

CROSS-REFERENCE TO RELATED APPLICATION

The present disclosure is a continuation of International Application No. PCT/US2021/054422, filed on Oct. 11, 2021, which claims the priorities of Chinese patent application No. 202011077578.9, filed on Oct. 10, 2020, Chinese patent application No. 202011080564.2, filed on Oct. 10, 2020, and Chinese patent application No. 202011188337.1, filed on Oct. 30, 2020, the disclosure of which are hereby incorporated by reference.

FIELD OF THE PRESENT DISCLOSURE

The present application relates to the technical field of display, and particularly relates to a view display method and display apparatus.

BACKGROUND OF THE PRESENT DISCLOSURE

In a scenario where resources such as large-scale images and videos are often intensively displayed on a display apparatus, the resources are displayed on a display in the form of a list.

SUMMARY OF THE PRESENT DISCLOSURE

In a first aspect, a display apparatus is provided, including: a display, configured for displaying a user interface, and a selector configured for indicating that an element is selected in the user interface, wherein the user interface includes a viewport; and at least one virtual list is displayed in the viewport; a user input interface, configured for receiving an input signal; and a controller connected with the display and the user input interface respectively, configured for: receiving a user operation for continuously moving out of the viewport by causing the selector position on a boundary element of the viewport; determining first element numbers that correspond to elements in a virtual list in which the boundary element is located according to the received user operation; determining second element numbers that correspond to to-be-displayed elements on the virtual list according to the first element numbers and a direction of the selector moving out of the viewport; sorting the second element numbers, so that the sorted second element numbers are obtained by replacing the minimum element numbers on the basis of the first element numbers; updating a virtual list rendered by the elements that correspond to the first element numbers by utilizing the sorted second element numbers, wherein only elements that correspond to element numbers different from the first element numbers are rendered in the sorted second element numbers when the virtual list is updated; and controlling total elements in the updated virtual list to be displayed in the viewport.

In some embodiments, the controller is configured for determining the second element numbers that correspond to the to-be-displayed elements on the virtual list in accordance with the first element numbers and the selector direction of moving out of the viewport by: moving the selector by m times when the virtual list is a horizontal virtual list; adding m to the first element numbers if the selector is not located on the last m elements in corresponding resources of the virtual list and a direction of the selector moving out of the viewport is right; and subtracting m from the first element numbers if the selector is not located on the previous m elements in the corresponding resources of the virtual list and the direction of the selector moving out of the viewport is left.

In some embodiments, the controller is configured for determining the second element numbers that correspond to the to-be-displayed elements on the virtual list in accordance with the first element numbers and the direction of the selector moving out of the viewport by: moving the selector by w times when the virtual list is a vertical virtual list; adding w to the first element numbers if the selector is not located on the last w elements in corresponding resources of the virtual list and the direction of the selector moving out of the viewport is downward; and subtracting w from the first element numbers if the selector is not located on the previous w elements in the corresponding resources of the virtual list and the selector direction of moving out of the viewport is upward.

In some embodiments, the controller is configured for sorting the second element numbers by: calculating a remainder of the second element numbers according to the number of the second element numbers; and arranging the second element numbers according to the remainder to obtain the sorted second element numbers.

In some embodiments, wherein the controller is further configured for controlling total elements in the updated virtual list to be displayed in the viewport by modifying an outer element style.

In a second aspect, a display apparatus is provided, including: a display, configured for displaying a user interface, and a selector configured for indicating that an element is selected in the user interface, wherein the user interface includes a viewport; and at least one virtual list is displayed in the viewport; a user input interface, configured for receiving an input signal; and a controller connected with the display and the user input interface respectively, configured for: receiving a user operation for continuously moving out of the viewport by causing the selector position on a boundary element of the viewport; determining first element numbers that correspond to elements in a virtual list in which the boundary element is located according to the user operation; determining replaced element numbers and newly added element numbers in the first element numbers according to the first element numbers and a direction of the selector moving out of the viewport; and replacing the replaced element numbers in the first element numbers with the newly added element numbers to form third element numbers; updating a virtual list rendered by the elements that correspond to the first element numbers by utilizing the third element numbers, wherein only the newly added element numbers in the sorted third element numbers are rendered when the virtual list is updated; and controlling total elements in the updated virtual list to be displayed in the viewport.

In some embodiments, the controller is further configured for determining the replaced element numbers and the newly added element numbers in the first element numbers in accordance with the first element numbers and a direction of the selector moving out of the viewport by: if the virtual list is a horizontal virtual list and a direction of the selector moving out of the viewport is right; determining moving times of the selector towards the direction of moving out of the viewport; sorting element numbers in the first element numbers from big to small; taking element numbers that rank behind as the replaced element numbers, wherein a number of the replaced element numbers is equal to the moving times of the selector; and adding the largest element number in the first element numbers to a preset number to obtain the newly added element numbers, wherein the preset number may be all natural numbers that are less than or equal to n; n is more than 0; and a number of the newly added element numbers is equal to the moving times of the selector.

In some embodiments, the controller is further configured for determining the replaced element numbers and the newly added element numbers in the first element numbers in accordance with the first element numbers and a direction of the selector moving out of the viewport by: if the virtual list is a horizontal virtual list and a direction of the selector moving out of the viewport is left; determining moving times of the selector towards the direction of moving out of the viewport; sorting element numbers in the first element numbers from big to small; taking element numbers that rank ahead as the replaced element numbers, wherein a number of the replaced element numbers is equal to the moving times of the selector; and subtracting a preset number from the minimum element number in the first element numbers to obtain the newly added element numbers, wherein the preset number may be all natural numbers that are less than or equal to n; n is more than 0; and a number of the newly added element numbers is equal to the moving times of the selector.

In a third aspect, a viewport display method is provided, wherein the method includes: receiving a user operation for continuously moving out of a viewport by causing a selector position on a boundary element of the viewport; determining first element numbers that correspond to elements in a virtual list in which the boundary element is located according to the user operation; determining second element numbers that correspond to to-be-displayed elements on the virtual list according to the first element numbers and a direction of the selector moving out of the viewport; sorting the second element numbers, so that the sorted second element numbers are obtained by replacing the minimum element numbers on the basis of the first element numbers; updating a virtual list rendered by the elements that correspond to the first element numbers by utilizing the sorted second element numbers, wherein only elements that correspond to element numbers different from the first element numbers are rendered in the sorted second element numbers when the virtual list is updated; and controlling total elements in the updated virtual list to be displayed in the viewport.

In a fourth aspect, another viewport display method is provided. The method includes: receiving a user operation for continuously moving out of a viewport by causing a selector position on a boundary element of the viewport; determining first element numbers that correspond to elements in a virtual list in which the boundary element is located according to the received user operation; determining replaced element numbers and newly added element numbers in the first element numbers according to the first element numbers and a direction of the selector moving out of the viewport; and replacing the replaced element numbers in the first element numbers with the newly added element numbers to form third element numbers; updating a virtual list rendered by the elements that correspond to the first element numbers by utilizing the third element numbers, wherein only the newly added element numbers in the sorted third element numbers are rendered when the virtual list is updated; and controlling total elements in the updated virtual list to be displayed in the viewport.

In a fifth aspect, a display apparatus is provided, including: a display, configured for displaying a user interface; a user input interface, configured for receiving an input signal; and a controller connected with the display and the user input interface respectively, configured for: receiving a control signal for indicating display of image and text data input from the user interface; displaying the image and text data on the display in response to the control signal, wherein the image and text data includes picture and text content; displaying the picture according to an original size; displaying the text content in a text field; and displaying the text field on the picture.

In some embodiments, the controller is further configured for: receiving a first user operation through a first key value transmitted from a control device; and controlling to enlarge text field when the current text field is located on the edge of the picture, so as to enable the text field to cover the picture.

In some embodiments, the controller is further configured for: controlling to move text content in the text field according to the first user operation if the current text field covers the picture and the last line of the text content is not located on the lower boundary of the text field; and doing nothing if the current text field covers the picture and the last line of the text content is located on the lower boundary of the text field.

In some embodiments, the controller is further configured for: receiving a second user operation through a second key value transmitted from the control device; and not processing the user interface when the current text field is located on the edge of the picture.

In some embodiments, the controller is further configured for: when the current text field covers the picture and the last line of the text content is located on the upper boundary of the text field, controlling to scale down text field, wherein the reduced text field is located on the edge of the picture; and when the current text field covers the picture and the last line of the text content is not located on the upper boundary of the text field, controlling to move text content in the text field according to the second user operation.

In some embodiments, the controller is further configured for: receiving a third user operation through a third key value transmitted from the control device, wherein the image and text data includes multiple pictures; and rendering the user interface again by utilizing the next picture and the corresponding text content if the picture displayed on the user interface currently is not the last picture in a picture queue, wherein the text field is located on the edge of the picture.

In some embodiments, the controller is further configured for: receiving a fourth user operation through a fourth key value transmitted from the control device, wherein the image and text data includes multiple pictures; and rendering the user interface again by utilizing the previous picture and the corresponding text content if the picture displayed on the user interface currently is not the first picture in a picture queue, wherein the text field is located on the edge of the picture.

In some embodiments, a key prompt message is displayed on the picture.

In some embodiments, a progress bar is displayed on the text field when the text field covers the picture and a total display area of the text content is larger than the area of the text field.

In a sixth aspect, a user interface display method is provided, wherein the method includes: receiving a control signal for indicating display of image and text data input from a user input interface; displaying the image and text data on the display in response to the control signal, wherein the image and text data includes picture and text content; displaying the picture according to an original size; displaying the text content in a text field; and displaying the text field on the picture.

In a seventh aspect, a display apparatus is provided, including: a display, configured to display a recommendation area associated with media resources and a title of a list of media resources in a display area; a controller connected with the display, wherein the controller is configured to: acquire a list of media resource recommendations presented in the recommendation area, wherein the list of media resource recommendations includes media resource elements carrying title attributes; determine whether each media resource element in the list of media resource recommendations is completely located in the display area; determine media resource elements that correspond to the same title attribute and are completely located in the display area as a group of target media resource elements if media resource elements that are completely located in the display area exist in the list of media resource recommendations, wherein the same title attribute corresponds to one group of target media resource elements; acquire media resource list titles that correspond to each of the same title attributes, and display the media resource list titles that corresponds to the group of target media resource elements, above the recommendation area.

In some embodiments, the controller is further configured for determining whether each media resource element in the list of media resource recommendations is completely located in the display area by: add a corresponding index value for each of the media resource elements according to a sort order of each media resource element in the list of media resource recommendations; acquire an initial index value, traverse each of the index values from the initial index value, and determine whether media resource elements that correspond to each index value are completely located in the display area.

In some embodiments, the controller is further configured for acquiring the initial index value by: acquire a media resource element ranked first in the list of media resource recommendations as an initial media resource element when the list of media resource recommendations is a complete list; determine an index value that corresponds to the initial media resource element as an initial index value.

In some embodiments, the controller is further configured for acquiring the initial index value by: acquire media resource elements of the list of media resource recommendations located in a viewport when the list of media resource recommendations is a virtual list, wherein the virtual list refers to a list in which a portion of media resource elements are displayed in the viewport; determine an index value of the media resource element ranked first in the viewport as an initial index value.

In some embodiments, the controller is further configured for determining whether media resource elements that correspond to each index value are completely located in the display area by: acquire each pixel coordinate value of the media resource elements that correspond to the index value and a coordinate area range of the display area; determine that the media resource elements are not completely located in the display area if all pixel coordinate values of the media resource element are not completely located in the coordinate area range; determine that the media resource elements are completely located in the display area if all the pixel coordinate values of the media resource element is completely located in the coordinate area range.

In some embodiments, the controller is further configured for determining media resource elements that correspond to the same title attribute and are completely located in the display area as a group of target media resource elements if media resource elements that are completely located in the display area exist in the list of media resource recommendations by: if a target media resource element is completely located in the display area, determining the target media resource element as an initial media resource element in the list of media resource recommendations; if a next media resource element having the same title attribute as the target media resource element is not completely located in the display area, determining the next media resource element as a final media resource element; acquire all the media resource elements included from the initial media resource element to the final media resource element, and determine all the media resource elements as the group of target media resource elements that corresponds to the same title attribute.

In some embodiments, the controller is further configured for determining media resource elements that correspond to the same title attribute and are completely located in the display area as a group of target media resource elements if media resource elements that are completely located in the display area exist in the list of media resource recommendations by: if a target media resource element is completely located in the display area, determining the target media resource element as an initial media resource element in the list of media resource recommendations; compare a title attribute of a next media resource element that is completely located in the display area with the title attribute of the initial media resource element, and if a title attribute of a next media resource element that is completely located in the display area is inconsistent with the title attribute of the initial media resource element, determining a previous media resource element of the next media resource elements that generate inconsistent title attribute as a final media resource element; acquire all the media resource elements included from the initial media resource element to the final media resource element, and determine all the media resource elements as the group of target media resource elements that corresponds to the same title attribute.

In some embodiments, the controller is further configured for displaying the media resource list titles above the recommendation area that corresponds to the group of target media resource elements by: determining a title display position above the recommendation area based on a display position of the group of target media resource elements; and display the media resource list titles at the title display position.

In some embodiments, the controller is further configured for determining the title display position above the recommendation area based on the display position of the group of target media resource elements by: acquiring an initial position of the initial media resource element and a final position of the final media resource element in the group of target media resource elements; taking the initial position of the initial media resource element as an initial position of the title display position, and taking the final position of the final media resource element as a final position of the title display position; and determining the title display position above the recommendation area based on the initial position of the title display position and the final position of the title display position.

In an eighth aspect, an implementation method for dynamic display of media resource list with multiple titles is provided, wherein the method includes: acquiring a list of media resource recommendations presented in a recommendation area associated with media sources, wherein the list of media resource recommendations includes a plurality of media resource elements carrying title attributes; determining whether each media resource element in the list of media resource recommendations is completely located in the display area; determining one or more media resource elements that correspond to the same title attribute and are completely located in the display area as a group of target media resource elements if there are one or more media resource elements that are completely located in the display area in the list of media resource recommendations, wherein the same title attribute corresponds to a group of target media resource elements; and acquiring media resource list titles that correspond to each of the same title attributes, and displaying the media resource list titles above the recommendation area that corresponds to the group of target media resource elements.

In a ninth aspect, a computer readable non-volatile storage medium is provided, including instructions when executed by a processor are configured to cause a computer device to perform the above embodiments.

DESCRIPTION OF THE EMBODIMENTS

To make purposes, embodiments and advantages of the present disclosure clearer, illustrative embodiments of the present disclosure will be clearly and fully described below in combination with drawings in the embodiments of the present disclosure. Apparently, the embodiments described herein are merely part of rather than all of the embodiments in the present disclosure.

Based on the embodiments described in the present disclosure, all other embodiments obtained by those ordinary skilled in the art without making creative labor shall fall within the protection scope of the claims in the present disclosure.

It should be indicated that, brief descriptions of terms in the present disclosure are merely for facilitating understanding embodiments described below, not intended to limit the embodiments of the present disclosure. Unless otherwise noted, these terms shall be understood according to ordinary and general meanings.

The term "remote control" used in the present disclosure refers to a component of an electronic device (such as a display apparatus in the present disclosure), and may generally wirelessly control the electronic device in a short range. The remote control is generally connected with the electronic device by infrared rays and/or radio frequency (RF) signal and/or Bluetooth, and may also include function modules such as WiFi, wireless USB, Bluetooth and motion sensors. For example, a handheld touch remote control can replace most of the built-in physical keys in a general remote control device with a user interface in a touch screen.

Figure 1:
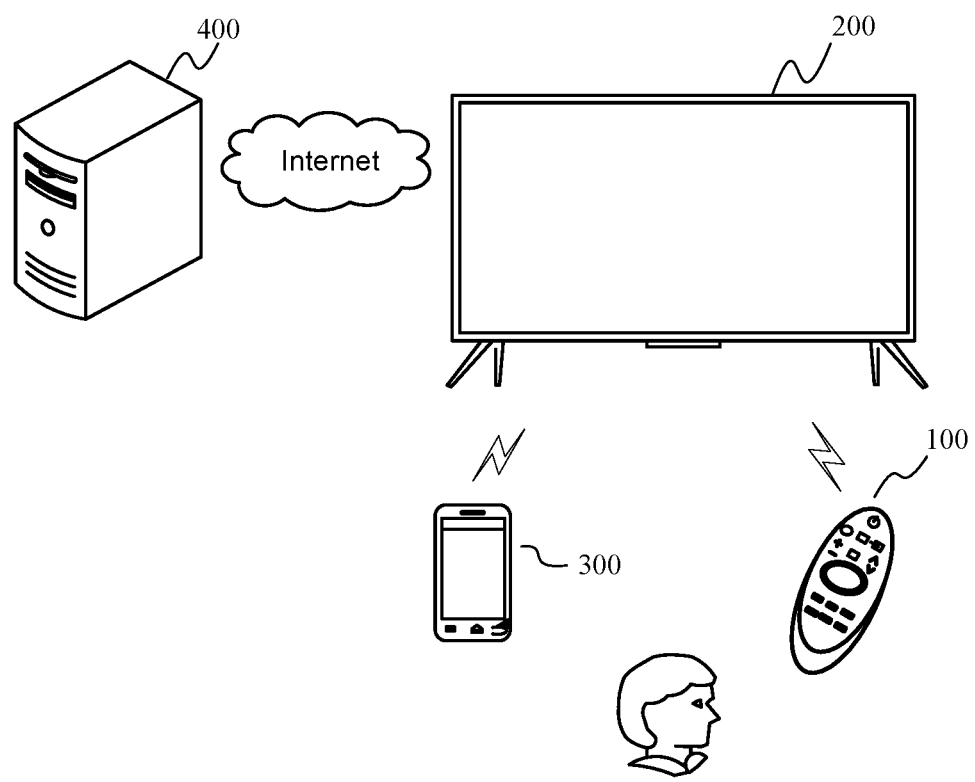
FIG. 1 illustrates a schematic diagram of an operation scenario between a display apparatus and a control device according to some embodiments.

FIG. 1 illustrates a schematic diagram of an operation scenario between a display apparatus and a control device according to some embodiments. As shown in FIG. 1, a display apparatus 200 may be operated by a user through a mobile terminal 300 and a control device 100.

In some embodiments, the control device 100 may be a remote control. Communications between the remote control and the display apparatus include infrared protocol communication or Bluetooth protocol communication, and other short-distance communication manners. The display apparatus 200 is controlled in a wireless manner or in other wired manners. The user may input user instructions through keys on the remote control, voice input and control panel input so as to control the display apparatus 200. For example, the user may input corresponding control instructions through volume +/− keys, channel control, top/bottom/left/right keys, a voice input key, a menu key and a power key on the remote control, so as to control functions of the display apparatus 200.

In some embodiments, the display apparatus 200 may also be controlled by using a mobile terminal, a tablet personal computer, a computer, laptop and other intelligent devices. For example, the display apparatus 200 may be controlled by applications running on the intelligent devices. The applications may provide various controls for the user in an intuitive user interface (UI) on a screen associated with the intelligent devices by configuration.

In some embodiments, the mobile terminal 300 and the display apparatus 200 may install application software, and then realize connection and communication by a network communication protocol, thereby achieving one-to-one control operation and data communication purposes. For example, a remote control function may be synchronized to the mobile terminal 300 by establishing a control instruction protocol between the mobile terminal 300 and the display apparatus 200; and then the functions of the display apparatus 200 are controlled by controlling the user interface on the mobile terminal 300. Further, audio and video contents displayed on the mobile terminal 300 may be transmitted onto the display apparatus 200, so as to realize a synchronous display function.

It is further provided in FIG. 1 that, the display apparatus 200 may be further in data communication with a server 400 in multiple communication manners. The display apparatus 200 may be allowed to establish communication connection with the server via a local area network (LAN), a wireless local area network (WLAN) and other networks. The server 400 may provide various contents and interactions for the display apparatus 200. For example, the display apparatus 200 receives software update or access a remotely stored digital media library through information transmission and reception and electronic program guide (EPG) interaction.

The display apparatus 200 may be a liquid crystal display, an OLED display or a projected display apparatus.

In addition to providing a broadcast reception television function, the display apparatus 200 may additionally provide a computer-supported intelligent network television function.

Figure 2:
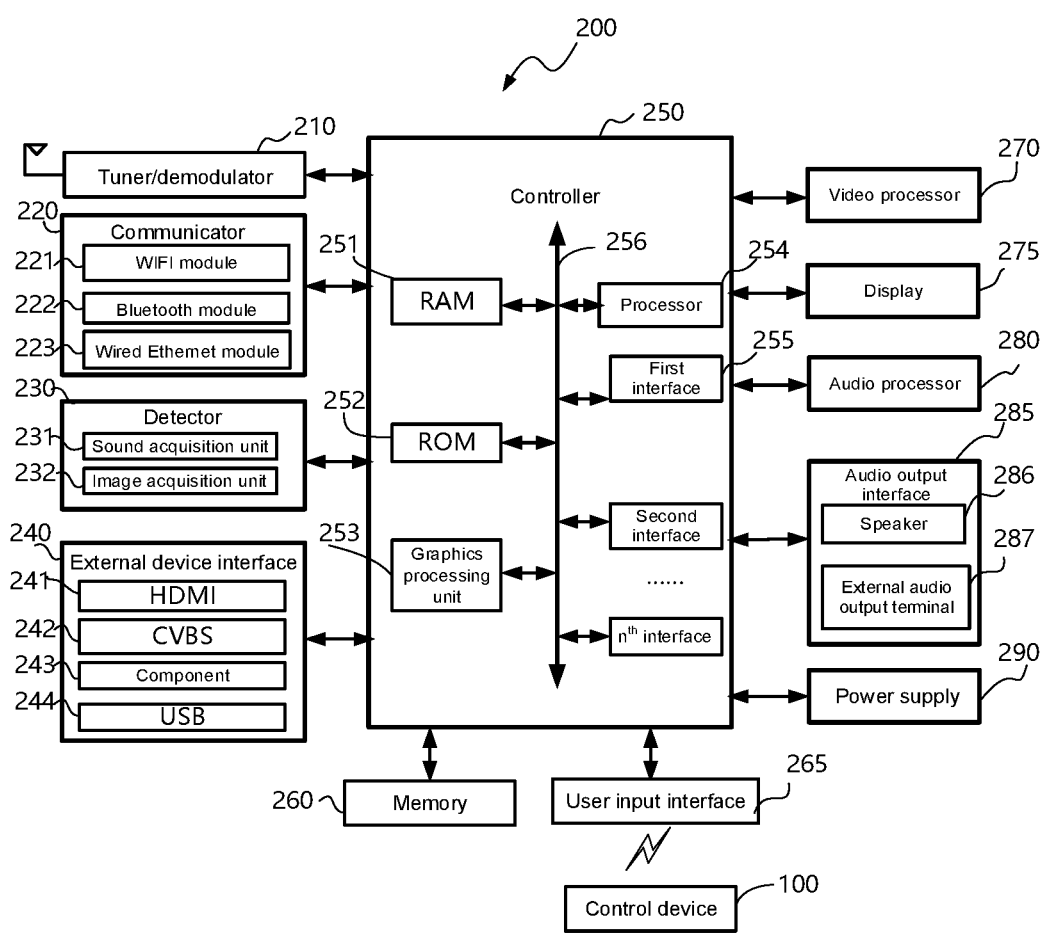
FIG. 2 illustrates a hardware configuration block diagram of a display apparatus 200 according to some embodiments.

FIG. 2 illustrates a hardware configuration block diagram of the display apparatus 200 according to some embodiments.

In some embodiments, the display apparatus 200 includes at least one of a controller 250, a tuner/demodulator 210, a communicator 220, a detector 230, an input/output interface 255, a display 275, an audio output interface 285, a memory 260, a power supply 290, a user interface 265 and an external device interface 240.

In some embodiments, the display 275 is configured for receiving an image signal output from a first processor, and includes components that display video contents and images and a menu control interface.

In some embodiments, the display 275 includes a display screen component for displaying images, and a driving component for driving image display.

In some embodiments, the displayed video contents may be radio and television contents and may also be various broadcast signals that may be received via a wired or wireless communication protocol; or, various image contents transmitted from a network server side via a network communication protocol may be displayed.

In some embodiments, the display 275 is configured for displaying a user interface UI that is produced in the display apparatus 200 and is configured for controlling the display apparatus 200.

In some embodiments, according to different types, the display 275 further includes a driving component for driving the display.

In some embodiments, the display 275 is a projected display, and may further include a projector and a projection screen.

In some embodiments, the communicator 220 is a component configured for communicating with an external device or an external server according to various communication protocol types. For example, the communicator may include at least one of a WiFi chip, a Bluetooth communication protocol chip, a wired Ethernet communication protocol chip or any other network communication protocol chip or near-field communication protocol chip, and an infrared receiver.

In some embodiments, the display apparatus 200 may establish control signal and data signal transmission and reception with an external control device 100 or a content provider device via the communicator 220.

In some embodiments, the user input interface 265 may be configured for receiving an infrared control signal from the control device 100 (such as an infrared remote control).

In some embodiments, the detector 230 is configured for acquiring an external environment signal or an external interaction signal by the display apparatus 200.

In some embodiments, the detector 230 includes an optical receiver, and a sensor configured for acquiring ambient light intensity, and may adapt to the change of display parameters and the like by acquiring ambient light.

In some embodiments, the detector 230 may further include an image capture unit such as a camera, may be configured for capturing an external environmental scene and acquiring user attributes or user interaction gestures, and may adaptively change display parameters and recognize user gestures so as to realize an interaction function with the user.

In some embodiments, the detector 230 may further include a temperature sensor for sensing an environment temperature.

In some embodiments, the display apparatus 200 may adaptively adjust a displayed color temperature of the image. In a higher-temperature environment, the display apparatus 200 may be adjusted to display a cool-toned image; or in a lower-temperature environment, the display apparatus 200 may be adjusted to display a warm-toned image.

In some embodiments, the detector 230 may further include a voice collector such as a microphone, configured for receiving voice from the user. For example, a voice signal of the control instruction of the display apparatus 200 is controlled by the user, or the environmental sound is acquired, for recognizing environmental scene types, so that the display apparatus 200 may be adapted to environmental noise.

In some embodiments, as shown in FIG. 2, the input/output interface 255 is configured to conduct data transmission between the controller 250 and any other external device or any other controller 250. For example, video signal data and audio signal data of the external device or command instruction data is received.

In some embodiments, the external device interface 240 may include but not limited to: any one or multiple interfaces of a high definition multimedia interface HDMI, an analog or digital high-definition component input interface, a composite video input interface, a USB input interface and an RGB port. The external device interface may also be a composite input/output interface formed by the above interfaces.

In some embodiments, the controller 250 and the tuner/demodulator 210 may be located in different separate devices, i.e., the tuner/demodulator 210 may be in an external device of a main device in which the controller 250 is located, such as an external set-top box. In this way, the set-top box outputs the TV audio/video signal by modulating or demodulating the received broadcasting TV signal to the main device; and the main device receives the audio/video signal via the first input/output interface.

In some embodiments, the controller 250 controls operations of the display apparatus and responds to user operations by virtue of various software control programs stored in the memory. The controller 250 may control overall operations of the display apparatus 200. For example, in response to receiving a user command for selecting to display a UI object on the display 275, the controller 250 may execute an operation associated with an object selected by the user command.

As shown in FIG. 2, the controller 250 includes at least one of a random access memory 251 (RAM), a read-only memory 252 (ROM), a video processor 270, an audio processor 280, and other processors 253 (such as, a graphics processing unit (GPU), a central processing unit 254 (CPU), a communication interface and a communication bus 256). The communication bus is connected with various components.

In some embodiments, when a startup signal is received, a power supply of the display apparatus 200 is started; a system startup instruction in the ROM 252 is operated by the CPU; and temporary data stored in an operating system of the memory is copied into the RAM 251, so as to start or initiate the operating system. After initiation of the operating system is completed, the CPU copies temporary data of various applications in the memory into the RAM 251, so as to start or launch the various applications.

In some embodiments, the CPU 254 is configured for executing instructions of the operating system and the applications stored in the memory, and executing various applications, data and contents according to the received various external input interactive instructions, so as to finally display and play various audio and video contents.

In some embodiments, the CPU 254 may include multiple processors. The multiple processors may include a main processor and one or more sub-processors. In some embodiments, the GPU 253 is used for producing various graphic objects, such as icons, operation menus and user input instruction display graphics. the multiple processors may include an operational unit, configured for operating by receiving various user input interactive instructions, and displaying various objects according to display attributes. The multiple processors may include a renderer, configured for rendering the various objects obtained based on the operational unit. The rendered objects are displayed on the display.

In some embodiments, the video processor 270 is configured to receive an external video signal and perform video processing according to a standard code-decode protocol of an input signal, to obtain a signal that can be directly displayed or played on the display apparatus 200.

In some embodiments, the video processor 270 includes a demultiplexing module, a video decoding module, an image synthesis module, a frame rate conversion module and a display formatting module.

In some embodiments, the GPU 253 may be integrated with the video processor and may also be separately arranged. When integrated, the GPU 253 may process a graphics signal output to the display; and when separately arranged, the GPU 253 may execute different functions respectively, such as GPU+FRC (Frame Rate Conversion) framework.

In some embodiments, the audio processor 280 is configured for receiving an external audio signal, performing decompressing and decoding according to the standard code-decode protocol of the input signal, and performing noise reduction, digital-to-analog conversion and amplification, to obtain a voice signal that can be played in a speaker.

In some embodiments, the video processor 270 may include one or more chips. The audio processor may also include one or more chips.

In some embodiments, the video processor 270 and the audio processor 280 may be single chips and may also be integrated in the one or more chips with the controller.

In some embodiments, during audio output, the voice signal output from the audio processor 280 is received under control of the controller 250. For example, besides the speaker 286 and speakers other than an own speaker of the display apparatus 200, the voice signal may be output to an external audio output terminal of a sound generating device of the external device, such as an external audio interface or a headphone jack. The audio output interface may further include a near field communication module in the communication interface, such as a Bluetooth module for performing Bluetooth speaker voice output.

The power supply 290 provides power input by an external power supply for the display apparatus 200 so as to provide power supply support under control of the controller 250. The power supply 290 may include a built-in power circuit installed inside the display apparatus 200. The power supply 290 may also be an external power supply installed outside the display apparatus 200, wherein a power interface for an external power supply is provided in the display apparatus 200.

The user input interface 265 is configured for receiving a user input signal and transmitting the user input signal to the controller 250. The user input signal may be a remote control signal received by the infrared receiver. Various user control signals may be received by a network communication module.

In some embodiments, the user inputs a user instruction via the control device 100 or the mobile terminal 300. The user input is responded by the user input interface according to user input, and by the display apparatus 200 through the controller 250.

In some embodiments, the user may input the user instruction on a graphical user interface (GUI) displayed on the display 275, and then the user input interface receives the user input instruction via the GUI; or, the user may input the user instruction by inputting specific voice or gestures, and then the user input interface recognizes the voice or gestures by a sensor so as to receive the user input instruction.

The memory 260 stores various software modules for driving the display apparatus 200, such as various software modules stored in a first memory, including at least one of a base module, a monitoring module, a communication module, a display control module, a browser module, and various service modules.

For example, a voice recognition module includes a voice parsing module and a channel-switching instruction database module. The display control module is a module configured for controlling the display to display image contents and may be used for playing multi-media image contents, the UI and other information. The communication module is configured for conducting control and data communication with the external device. The browser module is configured for executing data communication between browse servers. The service module is configured for providing various services and various applications. Meanwhile, the memory 260 is further configured for storing the received external data and user data, images of various items in the various user interfaces, and visual effect images of focus objects.

Figure 3:
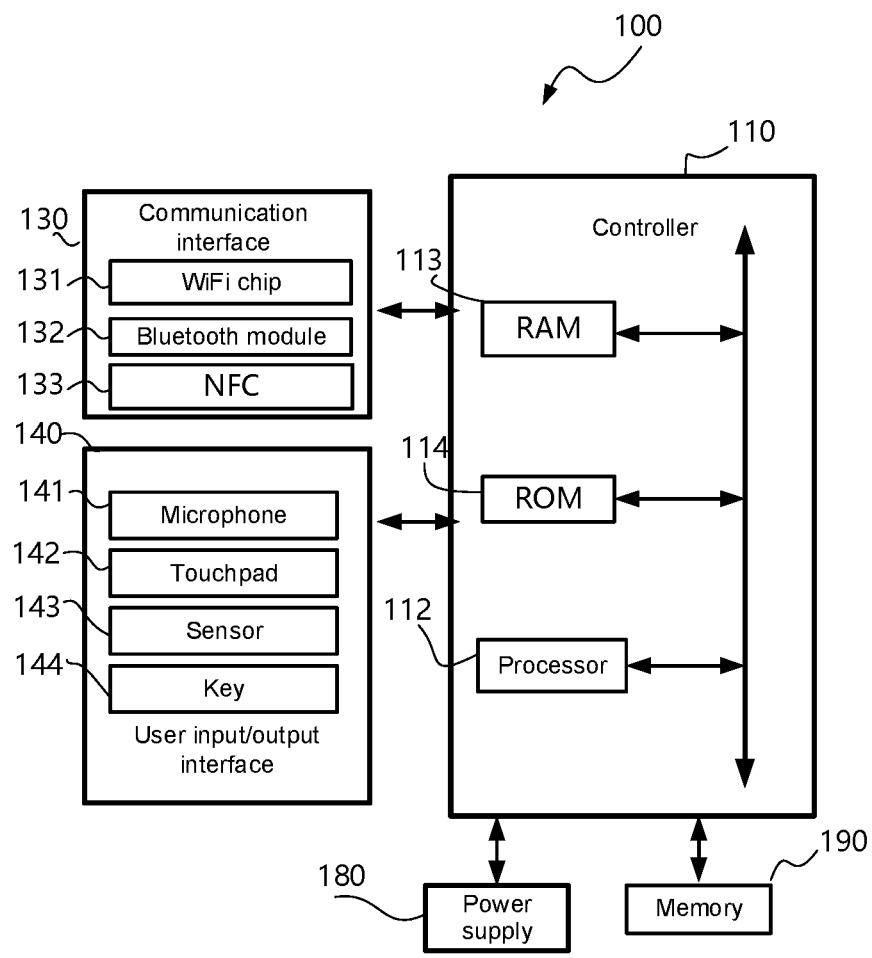
FIG. 3 illustrates a hardware configuration block diagram of a control device 100 according to some embodiments.

FIG. 3 illustrates a configuration block diagram of the control device 100 according to some embodiments. As shown in FIG. 3, the control device 100 includes a controller 110, a communication interface 130, a user input/output interface, a memory and a power supply.

The control device 100 is configured to control the display apparatus 200, receive an input operation instruction from the user, and convert the operation instruction into an instruction that can be recognized and responded by the display apparatus 200, acting as an interaction medium between the user and the display apparatus 200. For example, channel +/− keys on the control device 100 are operated by the user, and the display apparatus 200 responds to the channel +/− operation.

In some embodiments, the control device 100 may be an intelligent device. For example, various applications for controlling the display apparatus 200 may be installed by the control device 100 according to user requirements.

In some embodiments, as shown in FIG. 1, after the applications for controlling and operating the display apparatus 200 are installed, the mobile terminal 300 or any other intelligent electronic device may achieve similar functions of the control device 100. The controller 110 includes a processor 112, an RAM 113, an ROM 114, a communication interface 130 and a communication bus. The controller is configured for controlling running and operations of the control device 100, as well as cooperative communication among various internal components and external and internal data processing.

The communication interface 130 realizes control signal and data signal communication with the display apparatus 200 under control of the controller 110. For example, the received user input signal is transmitted to the display apparatus 200. The communication interface 130 may include at least one of a WiFi chip 131, a Bluetooth module 132, an NFC module 133 and any other near-field communication module.

Regarding the user input/output interface 140, the input interface includes at least one of a microphone 141, a touchpad 142, a sensor 143, a key 144 and any other input interface; the output interface includes an interface through which the received user instruction is transmitted to the display apparatus 200. In some embodiments, the user input/output interface may be an infrared interface or a radio frequency interface. In some embodiments, the control device 100 includes at least one of the communication interface 130 and the input/output interface 140. The control device 100 is provided with the communication interface 130, such as WiFi, Bluetooth or NFC module, whereby the user input instructions may be coded via a WiFi protocol, a Bluetooth protocol or an NFC protocol and then transmitted to the display apparatus 200.

The memory 190 is configured for storing various operation programs, data and applications that drive and control the control device 200 under the control of the controller. The memory 190 may be configured for storing various types of control signal instructions input from the user.

The power supply 180 is configured for providing operating power support for the various components of the control device 100 under the control of the controller. The power supply may include a battery and a related control circuit.

Figure 4:
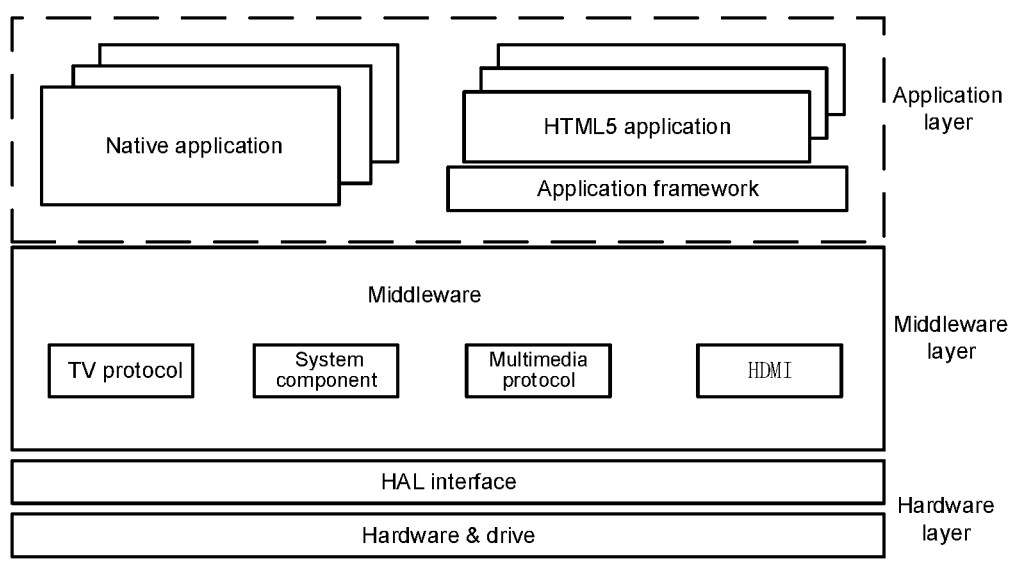
FIG. 4 illustrates a schematic diagram of software configuration in a display apparatus 200 according to some embodiments.

As shown in FIG. 4, the system of the display apparatus is divided into three layers, that is, an application layer, a middleware layer and a hardware layer from top to bottom.

Figure 5:
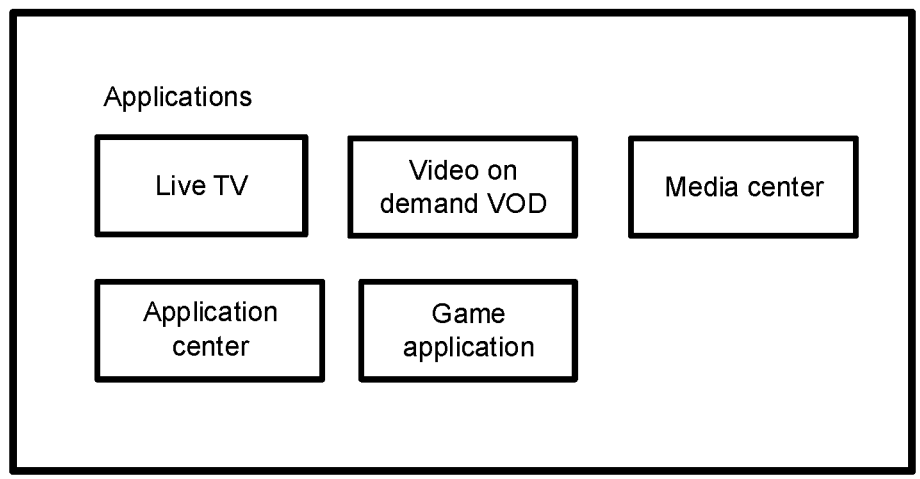
FIG. 5 illustrates a schematic diagram of icon control interface display of an application in a display apparatus 200 according to some embodiments.

In some embodiments, as shown in FIG. 5, the application layer includes at least one application. Corresponding icon controls may be displayed in the display 275, such as a live TV application icon control, a video-on-demand application icon control, a media center application icon control, an application center icon control and a game application icon control etc.

Embodiment I

In a scenario where resources such as large-scale images and videos are often intensively displayed on the display apparatus, the resources are displayed on the display in the form of a list. However, it is often found that the resources in the interface are slowly displayed when the resources in the list are viewed, so that using experience of the user is affected.

Figure 6:
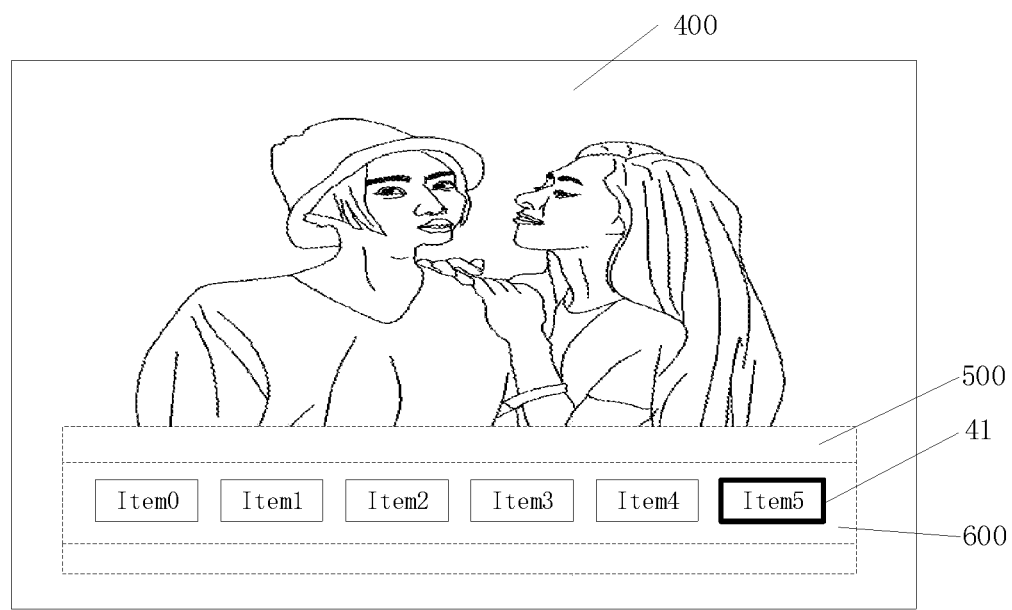
FIG. 6 illustrates a schematic diagram of a user interface according to some embodiments.
Figure 7:
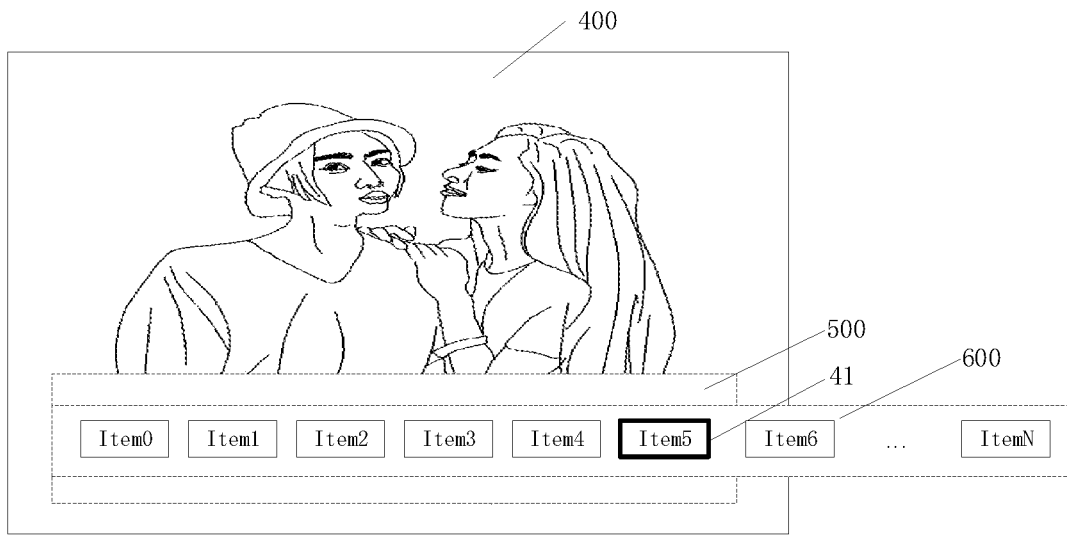
FIG. 7 illustrates a schematic diagram of another user interface according to some embodiments.

Through study of the inventors, the main reason why the above issues occur is as follows: as shown in FIG. 6, the interface 400 includes a viewport 500; the viewport is an area with a fixed size; a list 600 is displayed in the viewport; and the user can only see partial contents of the list in the viewport. There are many elements in the list. All the elements are fully rendered at a time by a list component ListView. As shown in FIG. 7, all the elements are recorded as Item1~ItemN. During component creation, all the elements are totally created no matter they are inside of the viewport or outside of the viewport. Since an area of the interface is limited, only elements Item0~Item5 are displayed. However, all the elements Item0~ItemN in the list are created, thus performance of the display apparatus is affected. Due to a large number of the elements, a generated DOM tree (element tree) occupies a large memory, and time consumption of traversing elements on the DOM tree is loner, so that the memory occupied by the elements and a memory occupied by event monitoring are larger. Finally, when the memory is occupied to a certain degree, the device is stuck, thereby affecting overall performance of the display apparatus and user experience of the list operation.

Figure 8:
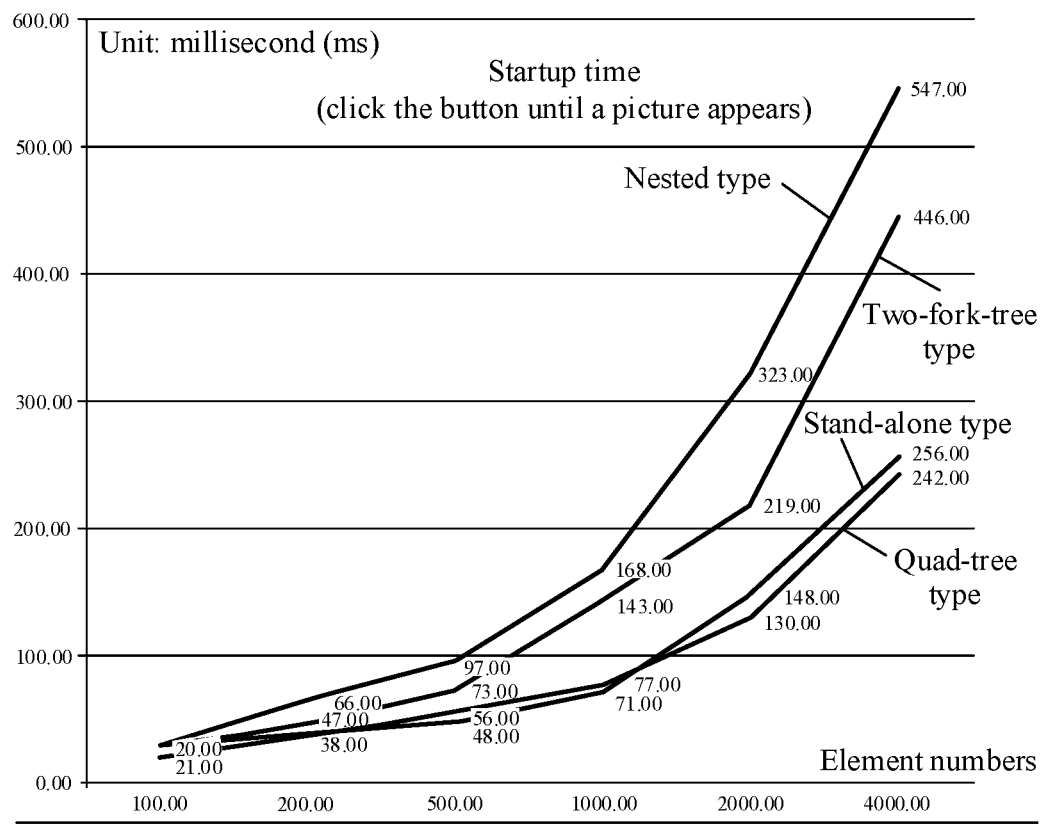
FIG. 8 illustrates a schematic diagram of the effect of different numbers of elements on page start-up time according to some embodiments.

As shown in FIG. 8, the effects of different numbers of elements in the DOM tree on page start time is shown. It is found that, the higher the element numbers are, the longer the page start time is. To sum up, time cost of creating and rendering the elements is extremely high. If there are more element numbers, time needed for rendering the total elements in the complete list will be long, and thus the using experience of the user is affected. To compare rendering results of multiple solutions later, the above solution is called a first solution for convenience.

Since the time needed for rendering the list in the first solution is too long, a method for improving an implementation of the list by utilizing a virtual list is proposed in some embodiments, and is called a second solution.

In some embodiments, only elements displayed on the viewport are rendered in the virtual list. The virtual list may significantly decrease the time needed for creating and rendering the elements. The virtual list is a technology of rendering a certain part of nodes in a long list according to viewport of scrollable elements.

By using an idea of loading on demand, not all the elements are rendered, and only a part of elements in the viewport are rendered. Since only the viewport is rendered by the virtual list in any case, the number of rendered element is decreased, the rendering performance may be increased, and the memory occupied by the elements may be decreased.

Figure 9:
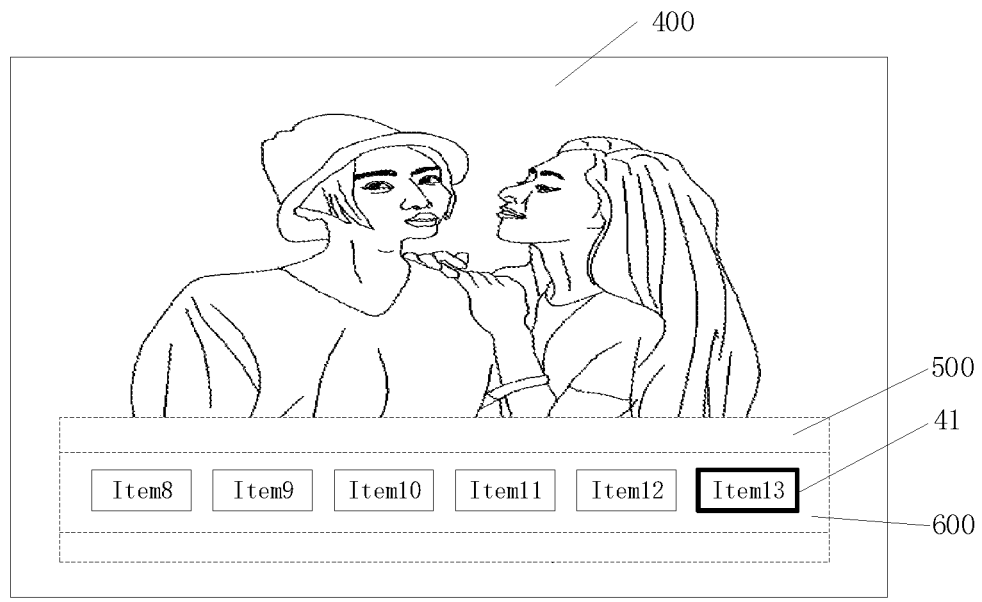
FIG. 9 illustrates a schematic diagram of another user interface according to some embodiments.
Figure 10:
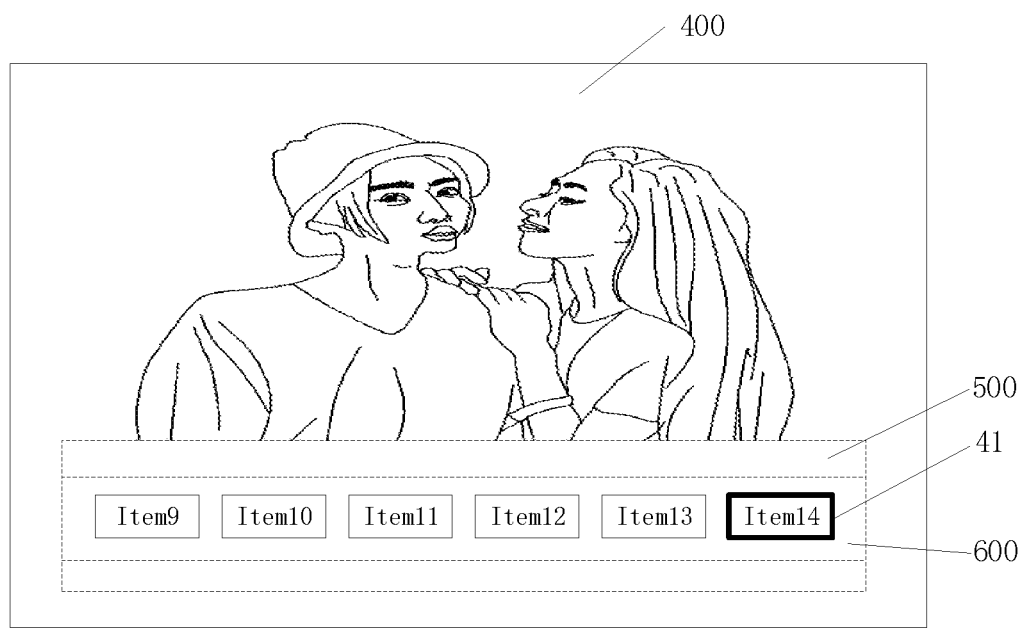
FIG. 10 illustrates a schematic diagram of another user interface according to some embodiments.

In some embodiments, when there are tens of thousands of elements in the list, if the solution of the virtual list is adopted, as shown in FIG. 9, only 6 elements, such as Item8~Item13 in the viewport, need to be rendered. When a selector moves towards right and moves out of the viewport range, elements such as Item9~Item14 need to be displayed, as shown in FIG. 10, and the 6 rendered elements need to be updated. Then, an aim of rapidly rendering the elements in the virtual list may be achieved. However, although the number of the rendered elements during list creation is decreased in the virtual list, when the selector moves out of the viewport, all the rendered elements need to be rendered again, and therefore the performance of the display apparatus is affected a lot.

In some embodiments, the virtual list is realized by processing the change of the viewport after moving of the selector (or scrolling of the scroll bar). Specific steps are as follows: (1) calculating startIndex of initial data in the current viewport; (2) calculating endIndex of end data in the current viewport; and (3) calculating elements in the current viewport, and rendering the elements in the virtual list. Referring to FIG. 9 again, 6 elements may be displayed in the viewport range. When the selector is located on Item13, the elements in the virtual list are controlled to move towards right according to a right key on the control device, and then the elements in the viewport need to be replaced. The Item8 is changed into Item9, the Item9 is changed into Item10, and so on. By comparing FIGS. 9 and 10, it can be seen that, when the selector moves out of the viewport range, although the user only wants to change 1 element, all the elements in the viewport are actually changed, so that all the rendered elements need to be rendered again. On one hand, performance consumption is higher; on the other hand, the change of the elements will cause flash on the display interface for the user, thereby severely affecting the user experience.

In some embodiments, the elements refer to visual objects that represent corresponding contents such as icons, thumbnails, video clips and links etc. These elements are various applications and service contents set by content makers.

It should be further noted that, the selector is configured for indicating any element that is selected, such as a focus object. The elements may be selected or controlled by the user by controlling the movement of the focus object in the display apparatus by the control device. For example, the user may select and control the elements by controlling direction keys on the control device to control the movement of the focus object among the elements.

Identification forms of the selector are various. For example, in FIG. 6, the selector 41 may identify the location of the focus object by changing the border, size, color, transparency, contour and/or font of text or images of focus items, may further realize or identify the location of the focus object by enlarging items, or realize or identify the location of the focus object by setting background colors for the items.

Embodiments of the present disclosure provide a viewport display method, referred to as a third solution. Before the method is described in detail, a list rendering process is introduced as follows. 1) Hypertext markup language (HTML) is parsed to generate a DOM tree; specifically, a render engine firstly parses a HTML document and then generates the DOM tree. 2) A Render tree is constructed; specifically, a cascading style sheet (CSS) introduced in an internal manner or an external manner or an embedded manner will be parsed to generate a CSSOM tree (a CSS object model); and another render tree configured for rendering is generated according to the DOM tree and the CSSOM tree. 3) The Render tree is laid out; specifically, each element of the Render tree is subjected to layout processing, and a display position of each element on the viewport is determined. 4) The Render tree is drawn; the Render tree is finally traversed and each element is drawn by using a back-end layer of the user interface (UI).

Through the descriptions of the above rendering process, it can be known that, an element sequence and a display position sequence are two different concepts. The DOM tree is obtained by parsing the HTML; the element sequence is determined through the DOM tree, while the element display position sequence depends on an associated CSS style. The method in the embodiments of the present application is to achieve viewport display effectiveness based on an independent characteristic of the element sequence and the display position sequence, thereby further improving the performance.

Figure 11:
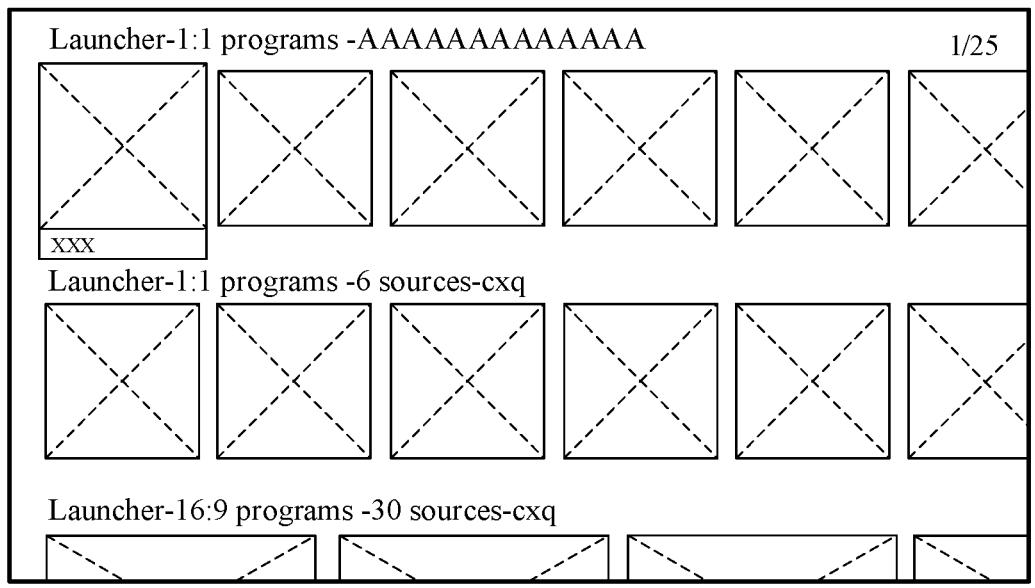
FIG. 11 illustrates a schematic diagram of another user interface according to some embodiments.

In some embodiments, when the resources such as the large-scale images and the videos are viewed by the user, a home page application may be opened by pressing a HOME key on the control device; and the selector moves towards the lower side of the home page by utilizing the control device so as to display the viewport. For example, the interface is shown as FIG. 11; and a multi-line virtual list is displayed in the viewport.

A user operation of continuously moving out of the viewport by the selector positioned on boundary elements of the viewport is received. For example, as shown in FIG. 6, the viewport includes a virtual list. When the selector is located on Item5, an operation of continuously moving the selector towards right by the user by utilizing the control device is received. It should be noted that, the boundary elements refer to boundary elements of the virtual list in the viewport range; and the selector is located behind the boundary elements and can continuously move out of the viewport. For example, as shown in FIG. 6, the boundary elements include the Item5. Although Item0 is also a boundary element located in the viewport, the controller cannot move out of the viewport (towards left) on the Item0. As shown in FIG. 9, the boundary elements include Item8 and Item13.

First element number that corresponds to elements in the virtual list in which the boundary elements are located are determined according to the received user operation. In the embodiments of the present disclosure, not all the elements in the virtual list are rendered, but only elements displayed in the viewport are rendered. Therefore, the first element number that corresponds to the elements in the virtual list in which the boundary elements are located are a number of the elements displayed on the viewport. For example, when the number of the elements displayed on the viewport in the virtual list is 6, in the embodiments of the present application, the value of the first element number that corresponds to the elements in the virtual list in which the boundary elements are located is 6.

Figure 12:
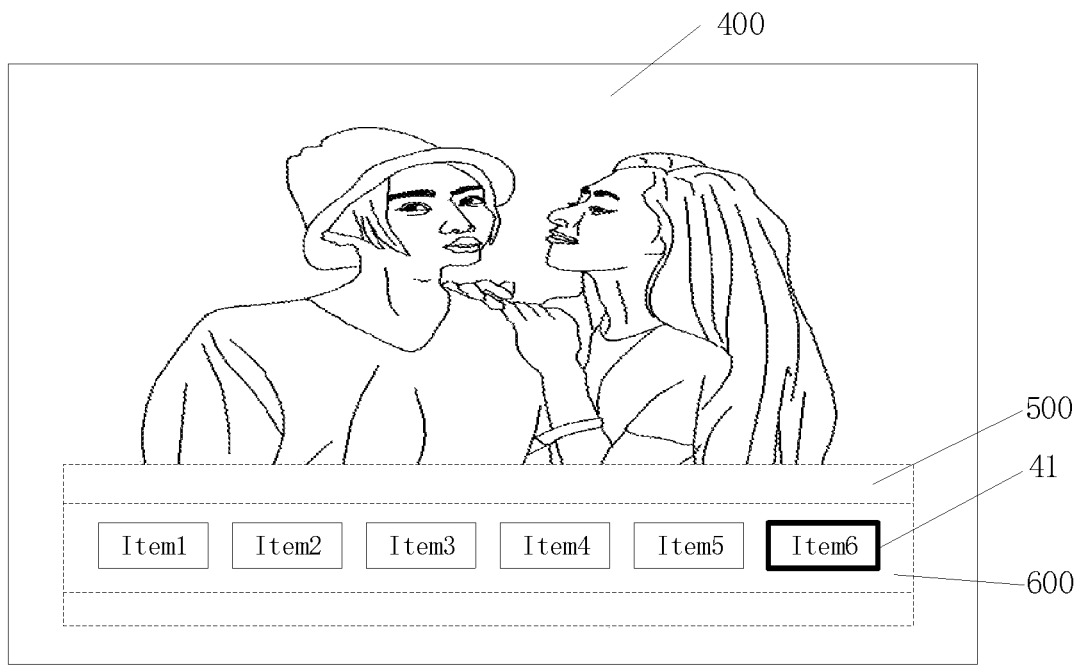
FIG. 12 illustrates a schematic diagram of another user interface according to some embodiments.

As shown in FIG. 6, when the boundary element is the Item5, elements in the virtual list in which the Item5 is located include Item0-Item5, and then the first element number that correspond to the Item0-Item5 are determined. In some embodiments, the first element number may be 0-5. As shown in FIG. 12, when the boundary element is Item6, elements in the virtual list in which the Item6 is located include Item1-Item6; and then the first element numbers that correspond to the Item1-Item6 may be 6, 1, 2, 3, 4 and 5. It should be noted that, the first element numbers are not 1, 2, 3, 4, 5 and 6, this is because the first element numbers are not related with the display sequence.

Figure 13:
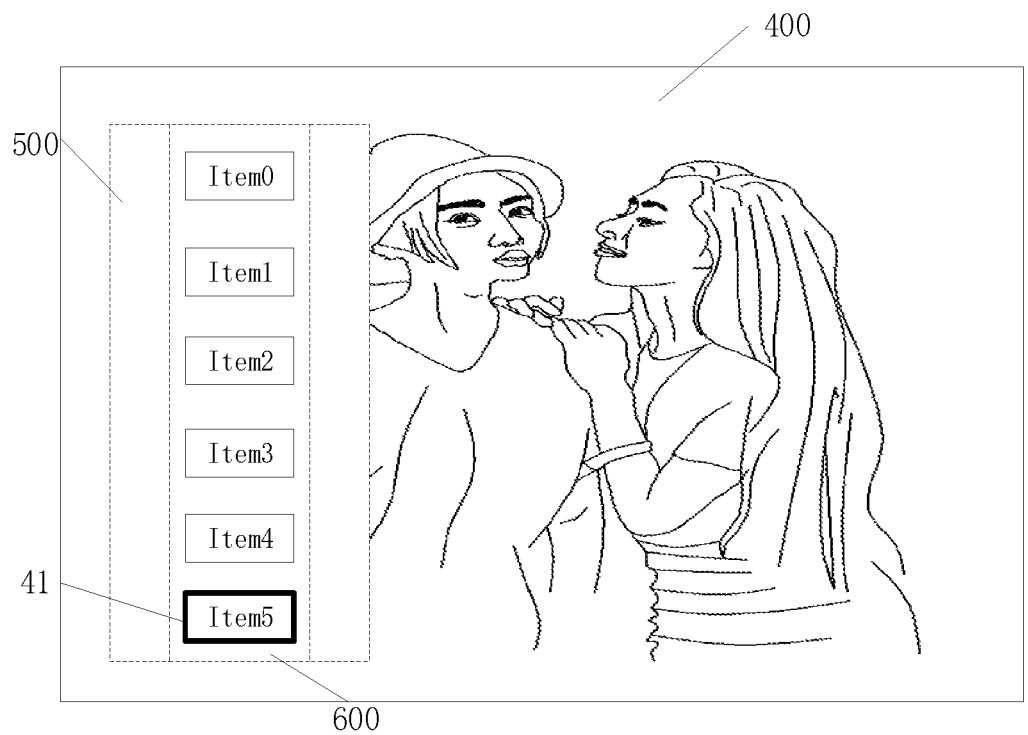
FIG. 13 illustrates a schematic diagram of another user interface according to some embodiments.

In the embodiments of the present application, a direction of the virtual list may be horizontal or vertical. As shown in FIG. 13, the virtual list is a vertical virtual list.

In some embodiments, the determining second element numbers that correspond to to-be-displayed elements on the virtual list according to the first element number and the direction of the selector moving out of the viewport includes: moving the selector by m times when the virtual list is a horizontal virtual list; and adding m to the first element number if the selector is not located on the last m elements in corresponding resources of the virtual list and the direction of the selector moving out of the viewport is right. The corresponding resources of the virtual list refer to total elements that may be rendered in the virtual list. The corresponding resources of the virtual list may be determined according to the DOM tree. The resources may include multiple elements. For example, m is equal to 1. If the selector is located at the last one of the corresponding resources in the virtual list, the corresponding resources of the virtual list include 19 elements in total. When the selector is located on Item19, the selector cannot continuously move towards right; and then the elements displayed on the viewport in the virtual list are kept unchanged.

When the corresponding resources of the virtual list include 50 elements, the first element numbers are 0-5, the selector is located on the boundary element, and the direction of the selector moving out of the viewport is right, the selector moves once, and m is equal to 1. Then, each element number in the first element numbers is added by 1; and second element numbers are 1-6. In some embodiments, the user controls the selector to fall on the boundary element, and controls the selector to continuously move for many times towards the same direction until outside the viewport in a short time. For example, the user may continuously press keys such as "left", "right", "top" and "bottom" on the control device. When the first element numbers are 0-5, the direction of the selector moving out of the viewport is right, the selector moves for 2 times, and m is equal to 2. Then, each element number in the first element numbers is added by 2; and the second element numbers are 2-7. When the first element numbers are 0-5, there are totally 6 elements in the corresponding resources of the virtual list; the selector is located on the boundary element, and the direction of the selector moving out of the viewport is right, the selector moves twice, and m is equal to 2. Then, since a maximum value of the first element numbers added by 2 has exceeded 6, the first element numbers are not added by 2 but added by 1 when the second element numbers are determined, i.e., the second element numbers are 1-6.

The number of times the selector is moved is m. The first element numbers are subtracted by m if the selector is not located on the previous m elements in the corresponding resources of the virtual list and the direction of the selector moving out of the viewport is left. For example, when the first element numbers are 6, 1, 2, 3, 4 and 5, the direction of the selector moving out of the viewport is left, the selector moves once, and m is equal to 1, the second element numbers are 5, 0, 1, 2, 3 and 4. In the embodiments of the present application, the directions of the selector moving out of the viewport are left and right; and a principle of determining the second element numbers on the basis of the first element numbers is basically similar. Therefore, details are omitted herein.

In some embodiments, the determining the second element numbers that correspond to the to-be-displayed elements on the virtual list in accordance with the first element numbers and the direction of the selector moving out of the viewport includes: moving the selector by w times when the virtual list is a vertical virtual list, as shown in FIG. 13; adding w to the first element numbers if the selector is not located on the last w elements in corresponding resources of the virtual list and the direction of the selector moving out of the viewport is downward; and subtracting w from the first element numbers if the selector is not located on the previous w elements in the corresponding resources of the virtual list and the direction of the selector moving out of the viewport is upward. In the embodiments of the present application, a process of determining the second element numbers in the vertical virtual list is similar to a process of determining the second element numbers in the horizontal virtual list. Thus, details will omit herein.

The second element numbers are sorted, so that the sorted second element numbers are obtained by replacing the minimum element numbers on the basis of the first element numbers. In the embodiments of the present application, sorting the second element numbers may be understood as adjustment of positions of the second element numbers. However, there are no new element numbers, and the element numbers will not be deleted. For example, when the first element numbers are 0, 1, 2, 3, 4 and 5, the second element numbers are 1, 2, 3, 4, 5 and 6. To ensure that the sorted second element numbers may be obtained by replacing the minimum element numbers on the basis of the first element numbers, the sorted second element numbers are 6, 1, 2, 3, 4 and 5.

When the first element numbers are 6, 1, 2, 3, 4 and 5, and the second element numbers are 5, 0, 1, 2, 3 and 4, the sorted second element numbers are 0, 1, 2, 3, 4 and 5.

In some embodiments, the sorting the second element numbers includes: calculating a remainder of the second element numbers according to the number of the second element numbers; and arranging the second element numbers according to the remainder to obtain the sorted second element numbers. For example, the first element numbers are 0, 1, 2, 3, 4 and 5; the second element numbers are 1, 2, 3, 4, 5 and 6; the value of the second element numbers is 6; when all of the second element numbers are divided by 6, corresponding remainders of the second element numbers are 1, 2, 3, 4, 5 and 0; the second element numbers are sorted according to the corresponding remainders; the element number 6 with the minimum remainder ranks first; and the rest element numbers are sorted according to the above rule. Thus, the finally sorted second element numbers are 6, 1, 2, 3, 4 and 5; and only one element number in the sorted second element numbers is changed on the basis of the first element numbers.

For example, the first element numbers are 6, 1, 2, 3, 4 and 5; the second element numbers are 5, 0, 1, 2, 3 and 4; the number of the second element numbers is 6; and corresponding remainders of the second element numbers are 5, 0, 1, 2, 3 and 4. After the second element numbers are sorted according to the corresponding remainders, the finally sorted second element numbers are 0, 1, 2, 3, 4 and 5. It can be seen that, only one element number in the sorted second element numbers is changed on the basis of the first element numbers.

For example, the first element numbers are 0, 1, 2, 3, 4 and 5; the second element numbers are 2, 3, 4, 5, 6 and 7; the number of the second element numbers is 6; and corresponding remainders of the second element numbers are 2, 3, 4, 5, 0 and 1. After the second element numbers are sorted according to the corresponding remainders, the finally sorted second element numbers are 6, 7, 2, 3, 4 and 5. It can be seen that, only two element numbers in the sorted second element numbers are changed on the basis of the first element numbers.

In some embodiments, the sorting the second element numbers includes: calculating remainders of any two element numbers in the second element numbers by utilizing the value of the second element numbers; and calculating a difference of the remainders of the any two element numbers. When the difference is greater than 0, the element number with a larger remainder is arranged behind other element number; and the element number with a smaller remainder is arranged in front of other element number. For example, the second element numbers are 1, 2, 3, 4, 5 and 6; 6 groups of data, such as 1 and 2, 2 and 3, 3 and 4, 4 and 5, 5 and 6, and 6 and 1, may be selected; remainder differences are respectively calculated; the remainder difference of the 1 and 2 is 1−2=−1, and 1 is arranged in front of 2; the remainder difference of the 2 and 3 is 2−3=−1, and 2 is arranged in front of 3; the remainder difference of the 3 and 4 is 3−4=−1, and 3 is arranged in front of 4; the remainder difference of the 4 and 5 is 4−5=−1, and 4 is arranged in front of 5; the remainder difference of the 5 and 6 is 5−0=5, and 6 is arranged in front of 5; and the remainder difference of the 6 and 1 is 0−1=−1, and 6 is arranged in front of 1. Therefore, the finally sorted second element numbers are 6, 1, 2, 3, 4 and 5.

The virtual list rendered by the elements that correspond to the first element numbers is updated by utilizing the sorted second element numbers. During update of the virtual list, only elements that correspond to element numbers different from the first element numbers in the sorted second element numbers are rendered.

In the embodiments of the present application, during update of the virtual list, only the elements that correspond to the element numbers different from the first element numbers in the sorted second element numbers are rendered. Elements that correspond to element numbers identical to the first element numbers are not rendered again. Thus, only an element that corresponds to one element number in the virtual list may be replaced, thereby decreasing rendering times and improving display efficiency.

Figure 15:
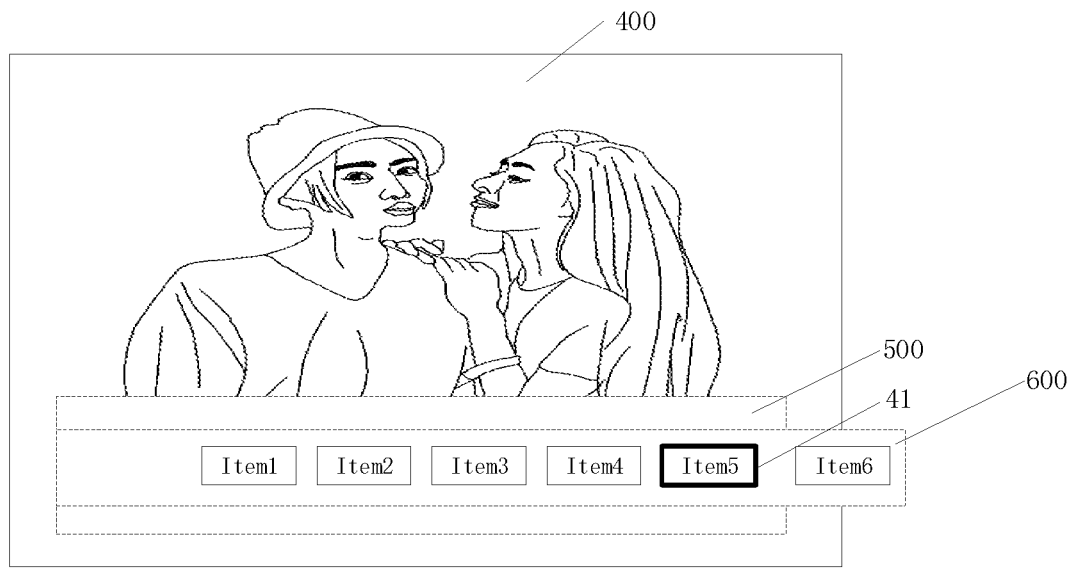
FIG. 15 illustrates a schematic diagram of another user interface according to some embodiments.
Figure 16:
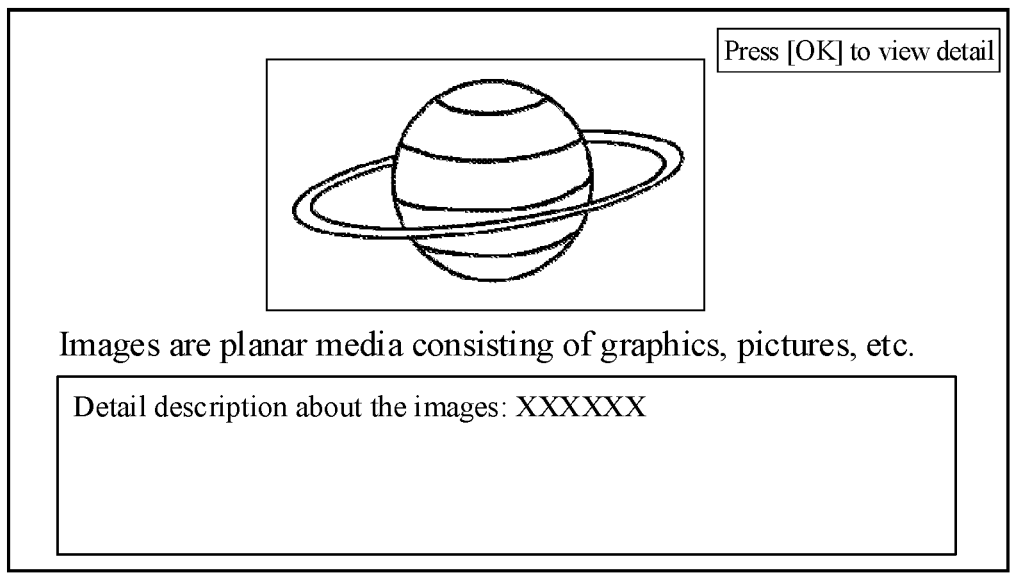
FIG. 16 illustrates a schematic diagram of a user interface according to some embodiments.

The elements in the updated virtual list are controlled to be totally displayed in the viewport. In some embodiments, the operation of controlling the elements in the updated virtual list to be totally displayed in the viewport is accomplished by modifying an outer element style. For example, the modified second element numbers are 6, 1, 2, 3, 4 and 5. After the virtual list rendered by the elements that correspond to the first element numbers is changed, as shown in FIG. 15, the outer element style is modified and finally displayed as an interface displayed in FIG. 12.

In the present application, the performance may be increased by reducing element update. Main reasons are as follows. 1) a JavaScript engine and a DOM engine of the browser share the same main thread; for any DOM API calling, a JavaScript data structure needs to be converted into a DOM data structure first; then the JavaScript engine is suspended and the DOM engine is started; a possible returned value is inverted in the data structure after execution; and the JavaScript engine is restarted for continuous execution; and therefore during such context switching a lot of resources are consumed. 2) reading/writing of multi-DOM API involves "recalculation" of layout so as to ensure accuracy of the returned value; and the involved style and structure will trigger page "redrawing", thereby consuming more resources.

In the embodiments of the present application, only the elements in the viewport may be rendered; and original DOM elements do not need to be destroyed and the DOM elements do not need to be created when the selector moves. A display effect needed during movement of the selector may be achieved by updating the original elements only, so that interface update efficiency in the movement process of the selector among many elements is greatly increased; and improved performance of the display apparatus may be achieved under a lower hardware configuration.

Figure 14:
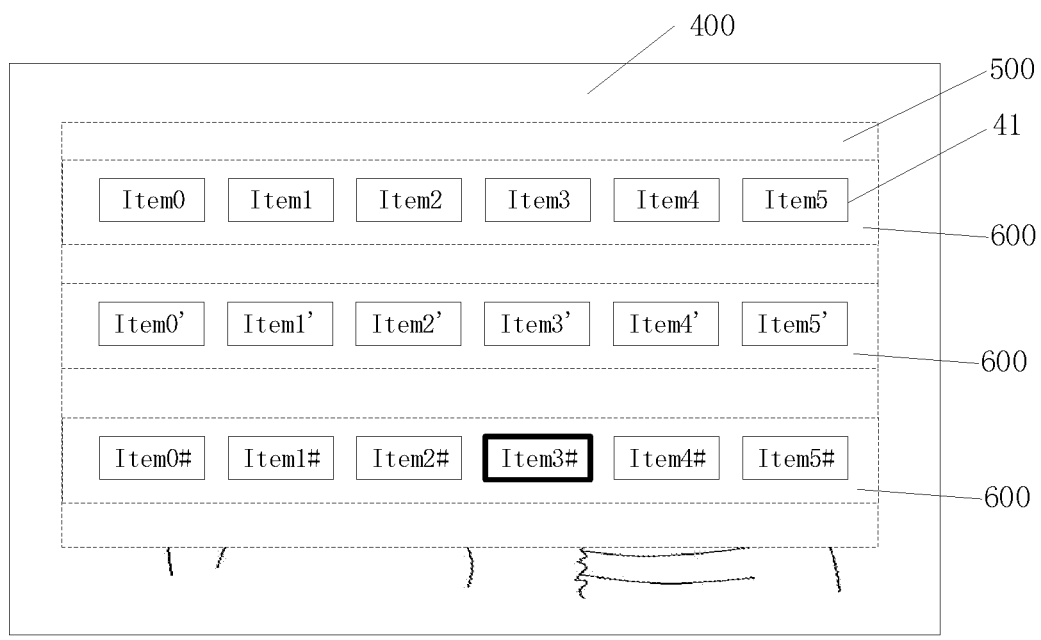
FIG. 14 illustrates a schematic diagram of another user interface according to some embodiments.

In some embodiments, for example, there are many virtual lists on the viewport, as shown in FIG. 14. When the selector is located on a control of the lowest virtual list displayed in the viewport, and a direction of the selector continuously moving out of the viewport is downward, the multiple virtual lists on the viewport are not totally rendered again; only element numbers in a next virtual list in the virtual list in which the selector is located in the resources are rendered again; and elements in the rest virtual lists that are the same as the current virtual list are not rendered. The implementation method is similar to a rendering method of the selector moving left and right in the virtual list. Thus, details will omit herein.

Comparison results of the three solutions are as follows. As shown in Table 1, it can be seen that, the rendered element numbers are minimum for the third solution.

Assuming that there are 25 elements in each line of the list in the viewport at most, and there are 30 vertical virtual lists, 6 elements may be horizontally displayed in the viewport, and 4 lines of the list may be displayed vertically.

TABLE 1

| Solution | Total rendered elements | Element variation during left-and-right movement of the controller | Element variation during top-and-bottom movement of the controller |
| --- | --- | --- | --- |
| Solution 1 | 25 * 30 = 750 | 0 | 0 |
| Solution 2 | 6 * 4 = 24 | 6 | 24 |
| Solution 3 | 6 * 4 = 24 | 1 | 6 |

In the third solution, there is another method for rendering the virtual list. The method includes the following steps.

While the selector is positioned on boundary elements of the viewport, receiving a user operation for continuously moving out of the viewport; and determining first element numbers that correspond to elements in the virtual list in which the boundary elements are located. The step is similar to a process of the solution 1 in the third solution. Thus, details will omit herein.

Replaced element numbers and newly added element numbers in the first element numbers are determined according to the first element numbers and the direction of the selector moving out of the viewport.

In some embodiments, the step of determining the replaced element numbers and newly added element numbers in the first element numbers according to the first element numbers and the direction of the selector moving out of the viewport includes: the virtual list is a horizontal virtual list and the direction of the selector moving out of the viewport is right; determining move times of the selector towards the direction of moving out of the viewport, wherein the move times may be determined by pressing keys on the control device by the user.

Element numbers in the first element numbers are sorted from a bigger one to a smaller one; and element numbers that rank behind are taken as the replaced element numbers, wherein a number of the replaced element numbers is equal to the move times of the selector. For example, the first element numbers are 0-5 and sorted from a bigger one to a smaller one. If the selector moves towards right once, 0 that ranks in the last place is the replaced element number. If the first element numbers are 6, 1, 2, 3, 4 and 5, the element numbers are sorted from a bigger one to a smaller one; if the selector moves towards right once, 1 that ranks in the last place is the replaced element number. If the first element numbers are 6, 1, 2, 3, 4 and 5, the element numbers are sorted from a bigger one to a smaller one; if the selector moves towards the right twice, 1 and 2 that rank in the last two places are the replaced element numbers.

A preset number is added to the maximum element number in the first element numbers to obtain the newly added element numbers, wherein the preset number may be all natural numbers that are less than or equal to n; n is greater than 0; and a number of the newly added element numbers is equal to the move times of the selector. For example, when the first element numbers are 0-5, the maximum element number in the first element numbers is 5, and the selector moves once, the newly added element number is 6. When the first element numbers are 0-5, the maximum element number in the first element numbers is 5, and the selector moves twice, the newly added element numbers are 5+1 and 5+2, i.e., the newly added elements are 6 and 7. Certainly, the first element numbers in the embodiments of the present application may also be sorted from a smaller one to a bigger one; and subsequent processes are roughly similar to those in the method of sorting from the bigger one to the smaller one. Thus, details will omit herein.

In some embodiments, the step of determining the replaced element numbers and newly added element numbers in the first element numbers according to the first element numbers and the direction of the selector moving out of the viewport includes:
the virtual list is a horizontal virtual list and the direction of the selector moving out of the viewport is left;
determining move times of the selector towards the direction of moving out of the viewport;
sorting element numbers in the first element numbers from a bigger one to a smaller one; and taking element numbers that rank ahead as the replaced element numbers, wherein a number of the replaced element numbers is equal to the move times of the selector towards left. For example, if the first element numbers are 6, 1, 2, 3, 4 and 5 and sorted from a bigger one to a smaller one, and the selector moves once, 6 that ranks first serves as the replaced element number. If the first element numbers are 6, 7, 2, 3, 4 and 5 and are sorted from a bigger one to a smaller one, and the selector moves twice, 6 and 7 that rank in the previous two places are the replaced element numbers;
subtracting a preset number from the minimum element number in the first element numbers to obtain the newly added element numbers, wherein the preset number may be all natural numbers that are less than or equal to n; n is greater than 0; and a number of the newly added element numbers is equal to the move times of the selector. For example, when the first element numbers are 6, 1, 2, 3, 4 and 5, the smallest element number in the first element numbers is 1, and the selector moves once, the newly added element number is 0. When the first element numbers are 6, 7, 2, 3, 4 and 5, the smallest element number in the first element numbers is 2, and the selector moves twice, the newly added element numbers are 2-1 and 2-2, i.e., the newly added elements are 1 and 0;
replacing the replaced element numbers in the first element numbers with the newly added element numbers to form third element numbers, wherein, for example, if the first element numbers are 0-5, the replaced element number is 0, and the newly added element number is 6, the third element numbers are 6, 1, 2, 3, 4 and 5; and if the first element numbers are 6, 7, 2, 3, 4 and 5, the replaced element numbers are 6 and 7, and the newly added element numbers are 1 and 0, the third element numbers are 0, 1, 2, 3, 4 and 5; and
updating a virtual list rendered by the elements that correspond to the first element numbers by utilizing the third element numbers, wherein only the newly added element numbers in the sorted third element numbers are rendered when the virtual list is updated; and controlling total elements in the updated virtual list to be displayed in the viewport.

In the above embodiments, a viewport display method and a display apparatus are provided, for improving user's experience. The method includes: while a selector is positioned on the boundary elements of the viewport, receiving a user operation for continuously moving out of the viewport; determining the first element numbers that correspond to the elements in the virtual list in which the boundary elements are located; determining the second element numbers that correspond to the to-be-displayed elements on the virtual list according to the first element numbers and the direction of the selector moving out of the viewport; sorting the second element numbers, so that the sorted second element numbers are obtained by replacing the minimum element numbers on the basis of the first element numbers; updating the virtual list rendered by the elements that correspond to the first element numbers by utilizing the sorted second element numbers, wherein only elements that correspond to the element numbers different from the first element numbers are rendered in the sorted second element numbers when the virtual list is updated; and controlling total elements in the updated virtual list to be displayed in the viewport.

Embodiment II

Figure 17:
FIG. 17 illustrates a schematic diagram of another user interface according to some embodiments.
Figure 18:
FIG. 18 illustrates a schematic diagram of another user interface according to some embodiments.
Figure 19:
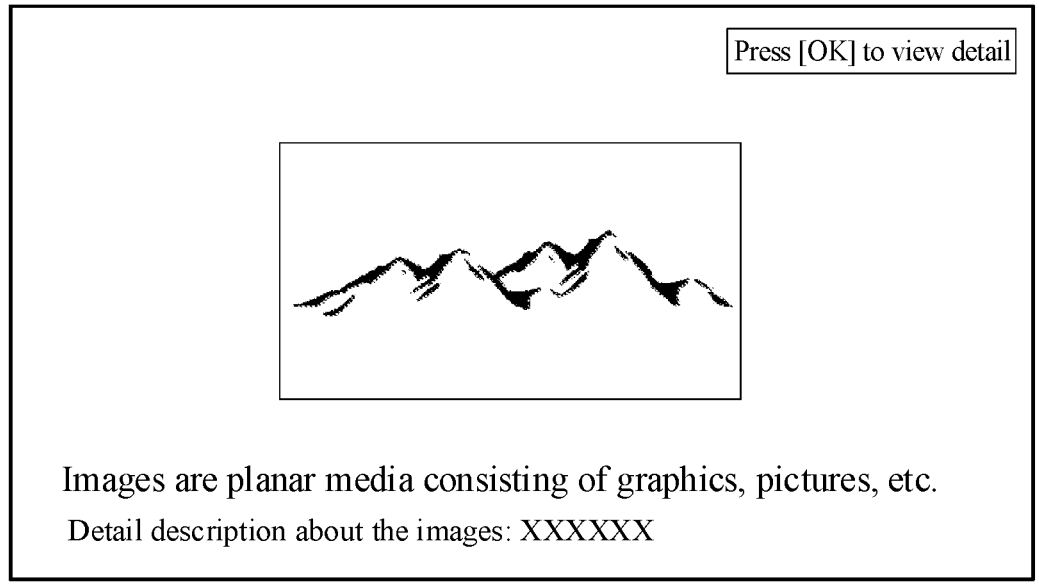
FIG. 19 illustrates a schematic diagram of another user interface according to some embodiments.

As the resource of the display apparatus is increasing, pictures and text contents are shown together can be seen everywhere. In related technologies, the pictures and text contents are vertically arranged on the display interface in sequence. When there are more display contents, all the contents cannot be displayed by the interface at a time. Then, the user needs to frequently operate the control device to move the contents that are not displayed on the interface into the viewport. For example, as shown in FIGS. 16-19, when a "down" key on the control device is pressed on the basis of the interface in FIG. 16, the display contents on the interface are changed, and interface is updated into an interface as shown in FIG. 17. On the basis of FIG. 17, the page is shown as FIG. 18 by continuously pressing the "down" key on the control device. On the basis of FIG. 18, the page is shown as FIG. 19 by continuously pressing the "down" key on the control device. In addition, on the basis of FIG. 19, the page may be shown as FIG. 18 by continuously pressing an "up" key on the control device. On the basis of FIG. 18, the page may be shown as FIG. 17 by continuously pressing the "up" key on the control device. On the basis of FIG. 17, the page may be shown as FIG. 16 by continuously pressing the "up" key on the control device. The display contents of the interface may be changed by using the control device.

However, in some cases, the user needs to compare the pictures and the text contents. If the pictures and the text contents cannot present simultaneously on the same interface, the user shall continuously operate the control device, thereby causing poor experience for the user.

In addition to the above issues, to guide the user to operate the control device so as to view other contents of the pictures in the related technologies, display sizes of the pictures are strictly limited. If the pictures are displayed on the entire display screen, it is difficult for the user to perceive that the text contents can be viewed, so high-definition pictures can only be displayed on the interface in the form of thumbnail in the related technologies. Thus, the display resources cannot be fully utilized; and effects of the high-definition pictures cannot be achieved, thereby causing waste of the resources. Further, when the keys such as "up" and "down" are operated by the user, the interface can only scroll upwards or downwards at the same amplitude, but scroll amplitudes needed for browsing the pictures and the text contents by the user are different. Therefore, the user experience of the movement degree is affected in the related technologies. In addition, due to uncertainty of sizes of the pictures and lengths of the text contents and existence of the progress bar, loading of the contents is difficult to realize. Thus, the total pictures and text contents needs to be recorded during loading, thereby causing great performance losses.

The embodiments of the present application provide a user interface display method. According to the method, the pictures and the text contents may be simultaneously displayed on the display, thereby solving problems in the related technologies that the control device needs to be continuously operated and the user experience is poor.

Figure 20:
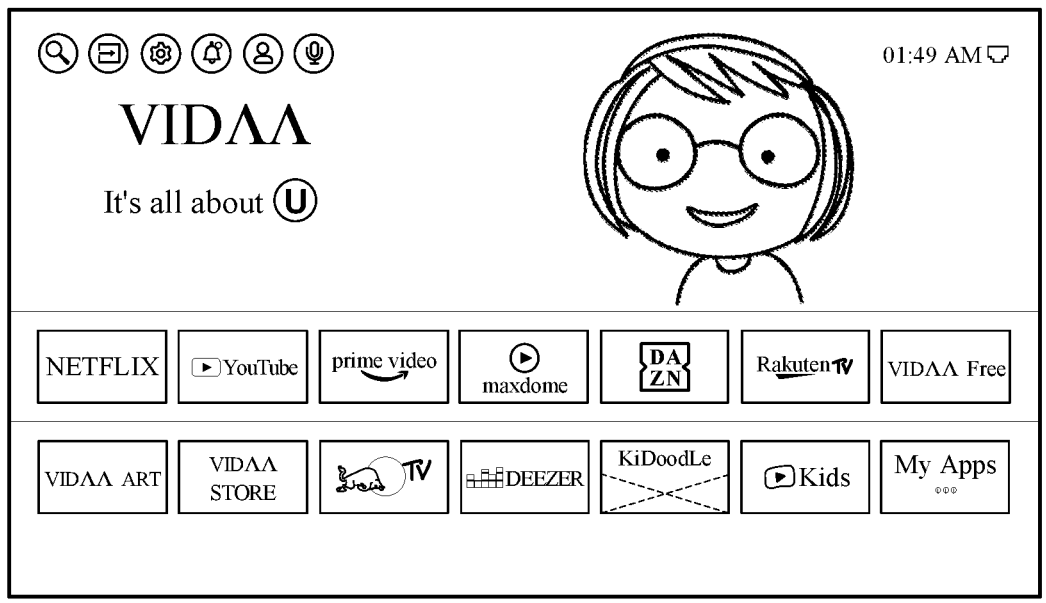
FIG. 20 illustrates a schematic diagram of another user interface according to some embodiments.
Figure 21:
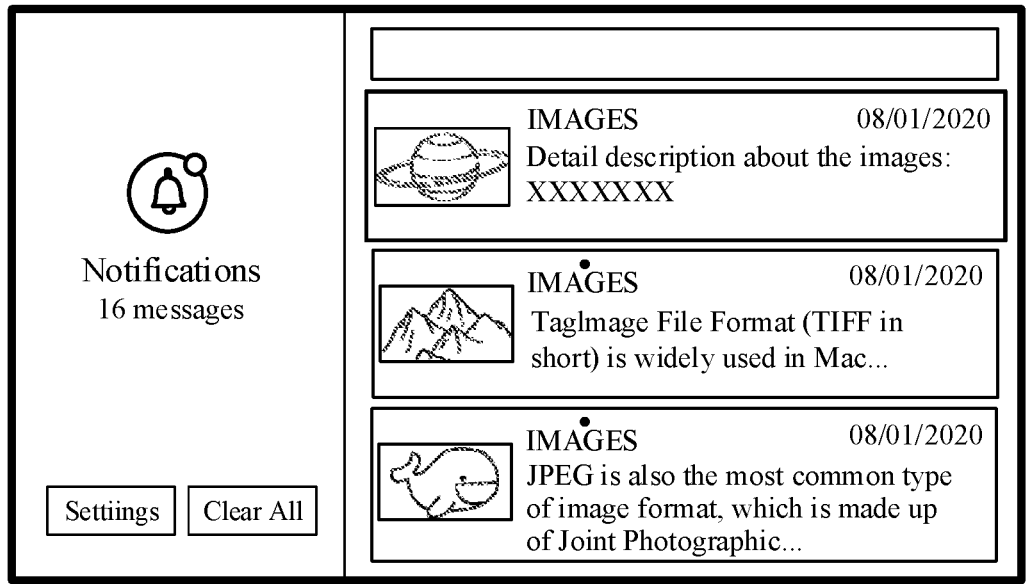
FIG. 21 illustrates a schematic diagram of another user interface according to some embodiments.

The method includes: receiving a control signal for indicating displaying of image and text data input from a user input interface. For example, as shown in FIG. 20, the user may move the selector to a notification control by the control device and press a key "OK" on the control device. In response to the user input, the interface skips to FIG. 21, and a plurality of message controls are displayed in FIG. 21. The selector moves to the message control by the control device, and the key "OK" on the control device is pressed; and then the control signal that indicates display of the image and text data is transmitted.

It should be further noted that, the selector is configured for indicating any control being selected, such as a focus object. The control may be selected or controlled by controlling movement of the focus object displayed in the display apparatus according to the input of the user through the control device. For example, the user may select and control the controls by controlling the direction keys on the control device to control the movement of the focus object among the controls.

Identification forms of the selector are diversified. For example, in FIG. 21, the selector may identify the location of the focus object by changing the border, size, color, transparency, outline and/or font of text or images of focus items, may further realize or identify the location of the focus object by enlarging items, or realize or identify the location of the focus object by setting background colors of the items.

The image and text data are displayed on the display in response to the user input. The image and text data includes pictures and text contents. For example, after the message control is selected by the user via the control device, screen of the display apparatus is shown as FIG. 22. In some embodiments, the image and text data that corresponds to the message control is configured by an operation platform, transmitted by a message channel, and then stored after received by the display apparatus.

The pictures are displayed according to original sizes; the text contents are displayed in a text field; and the text field is displayed on the pictures.

In the related technologies, due to many reasons, the pictures need to be displayed on the interface in the form of thumbnail. Thus, the display effect of the high-definition pictures is affected. For example, if 4K and other high-definition pictures can only be displayed in the form of thumbnail, the display resources cannot be fully utilized, and an operation effect of the 4K pictures cannot be achieved, resulting in waste of the resources. However, in the embodiments of the present application, the pictures are displayed according to the original sizes and are not shrunk. Thus, the picture display effect is better, and the pictures are conveniently viewed by the user. In some embodiments, if the original size of the picture is smaller than an area of the interface, the picture is displayed in the middle of the interface. If the original size of the picture is larger than or equal to the area of the interface, the picture is displayed on the whole display screen. For example, if the picture is a 4K picture with a ratio of 16:9 and the display is a 4K display, the picture is displayed on the whole display screen. If the picture is a 2K picture and the display is the 4K display, the picture may be displayed at a middle position of the display. In some embodiments, the picture may also be located on the upper side, lower side, left side or right side of the user interface.

In some embodiments, in response to a user input, the text field is located on the edge of the picture. For example, the text field may be located on the upper side, lower side, left side and right side of the picture. For example, as shown in FIG. 22, the text field is located on the lower side of the picture.

In some embodiments, except for the text contents, the rest of the text field is semitransparent. The text contents are displayed on the text field. When the text contents and the pictures have the same color, the text contents may be unclear. Therefore, in the embodiments of the present application, except for the text contents, the color of the rest of the text field is set as semitransparent, so that contents in the pictures can be seen clearly, and the text contents can be distinguished. For example, when a text color of the text contents is white, the color of the pictures and the corresponding parts thereof is also white. Thus, the text contents cannot be seen clearly. Therefore, the color of the text field may be set as semitransparent black in the embodiments of the present application.

Figure 22:
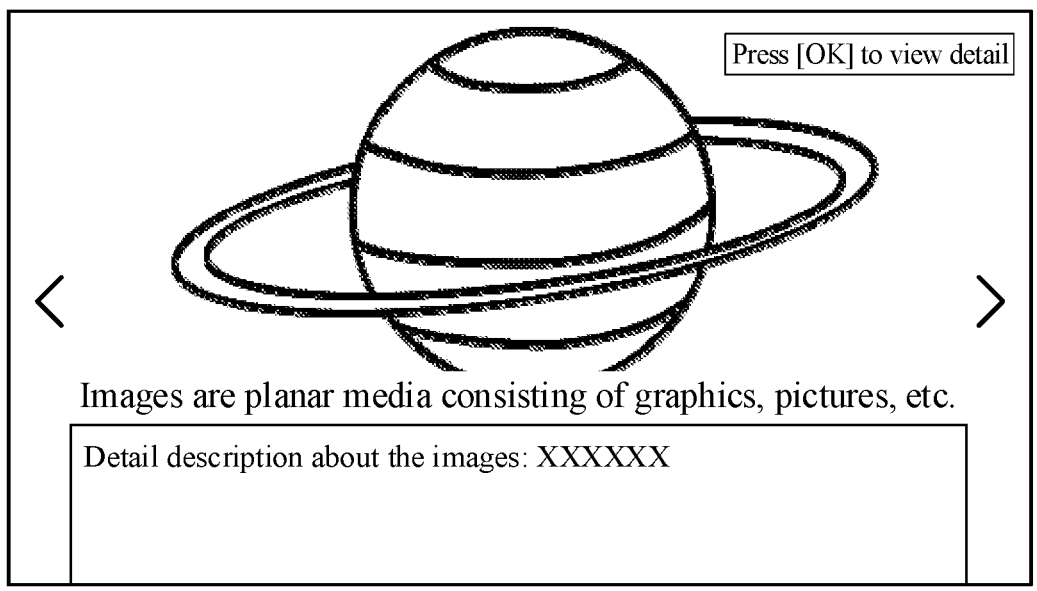
FIG. 22 illustrates a schematic diagram of another user interface according to some embodiments.

In the embodiments of the present application, when the color of the rest of the text field except for the text contents is set as semitransparent, the color may change from a light color to a dark color from top to bottom, as shown in FIG. 22. As long as the text contents and the pictures can be distinguished, the color of the text field is within the protection scope of the present application.

In some embodiments, the method further includes: receiving a first user operation through a first key value transmitted by the control device. For example, the key that corresponds to the first key value may be the key "down" on the control device.

Figure 23:
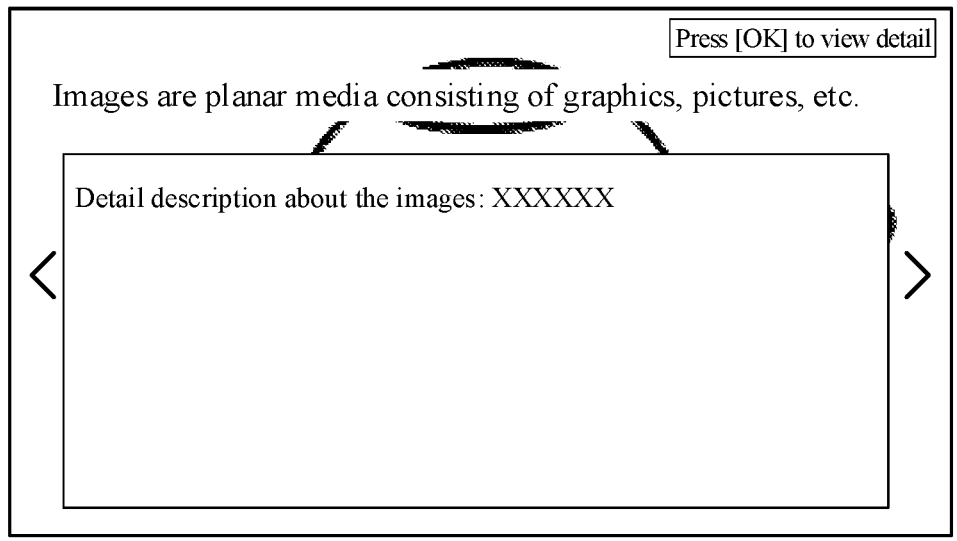
FIG. 23 illustrates a schematic diagram of another user interface according to some embodiments.

If the current text field is located on the edge of the picture, the text field is controlled to be enlarged, so that the text field covers the picture. In the embodiments of the present application, when the first user operation is received and the current text field is located on the edge of the picture, as shown in FIG. 22, the display apparatus controls the text field to be enlarged, so that more text contents may be displayed in the text field, as shown in FIG. 23.

In some embodiments, the method further includes: controlling movement of the text contents in the text field according to the first user operation when the current text field covers the picture and the last line of the text contents is not located on the lower boundary of the text field. For example, as shown in FIG. 23, the content displayed on the lower boundary of the text field is not the last line of the text contents. Therefore, in response to the first user operation, the interface is updated as FIG. 24.

In the embodiments of the present application, when the text field covers the picture, if the last line of the text contents is not located on the lower boundary of the text field, it is indicated that the text contents in the text field may continuously move upwards. Therefore, the text contents in the text field are controlled to move according to the first user operation.

Figure 24:
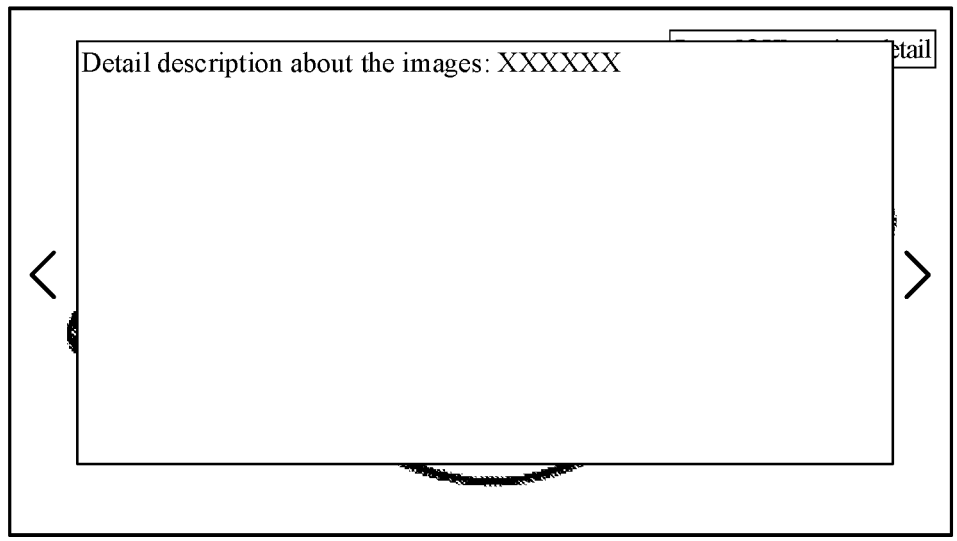
FIG. 24 illustrates a schematic diagram of another user interface according to some embodiments.

If the text field covers the picture, and the last line of the text contents is located on the lower boundary of the text field, nothing will be done. When the last line of the text contents is located on the lower boundary of the text field, it is indicated that the text contents in the text field cannot continuously move upwards. Therefore, the user operation is not processed by the display apparatus. For example, as shown in FIG. 24, the last line of the text contents is located on the lower boundary of the text field, so the first user operation is not processed by the display apparatus.

In some embodiments, the method further includes: receiving a second user operation via a second key value transmitted from the control device. For example, a key that corresponds to the second key value may correspond to the "up" key on the control device.

The user interface is not processed when the current text field is located on the edge of the picture. For example, as shown in FIG. 22, contents displayed in the current text field are contents of several foremost paragraphs of the text contents. Therefore, when the key "up" is pressed by the user, there are no contents located in front of the currently displayed text contents. Thus, the user operation is not processed by the display apparatus.

In some embodiments, the method further includes: controlling text field reduce when the current text field covers the picture and the last line of the text content is located on the upper boundary of the text field, wherein the reduced text field is located on the edge of the picture. For example, as shown in FIG. 23, the first line of the text contents in FIG. 23 is located on the upper boundary of the text field. In response to user pressing of the key "up", the interface is changed from FIG. 23 to FIG. 22.

Text content movement in the text field is controlled according to a second user operation when the current text field covers the picture and the last line of the text content is not located on the upper boundary of the text field. If the first line of the text contents is not located on the upper boundary of the text field, it is indicated that the text contents in the text field may continuously move downwards. Therefore, the text content movement in the text field is controlled according to the second user operation. For example, as shown in FIG. 24, In response to user pressing of the key "up", the interface is changed from FIG. 24 to FIG. 23.

In some embodiments, the method further includes: receiving a third user operation through a third key value transmitted by the control device, wherein the image and text data includes multiple pictures. For example, a key that corresponds to the third key value may be the key "right" on the control device.

The user interface is rendered again by utilizing the next picture and the corresponding text content if the picture displayed on the user interface currently is not the last picture in a picture queue, wherein the text field is located on the edge of the picture.

For example, the image and text data that corresponds to the message control may include multiple pictures; and the multiple pictures form a picture queue. If the current picture is not the last picture in the picture queue, when the key "right" on the control device is pressed by the user, pictures arranged behind the currently displayed picture in the picture queue and corresponding text contents of the pictures are controlled to be displayed on the user interface; and the text field is displayed on the edge of the picture.

In some embodiments, the method further includes: receiving a fourth user operation through a fourth key value transmitted by the control device, wherein the image and text data includes multiple pictures. For example, a key that corresponds to the fourth key value may be the key "left" on the control device.

The user interface is rendered again by utilizing the previous picture and the corresponding text content if the picture displayed on the user interface currently is not the first picture in a picture queue, wherein the text field is located on the edge of the picture.

For example, if the current picture is not the first picture in the picture queue, when the key "left" on the control device is pressed by the user, pictures arranged in front of the currently displayed picture in the picture queue and corresponding text contents of the pictures are controlled to be displayed on the user interface; and the text field is displayed on the edge of the picture.

Figure 25:
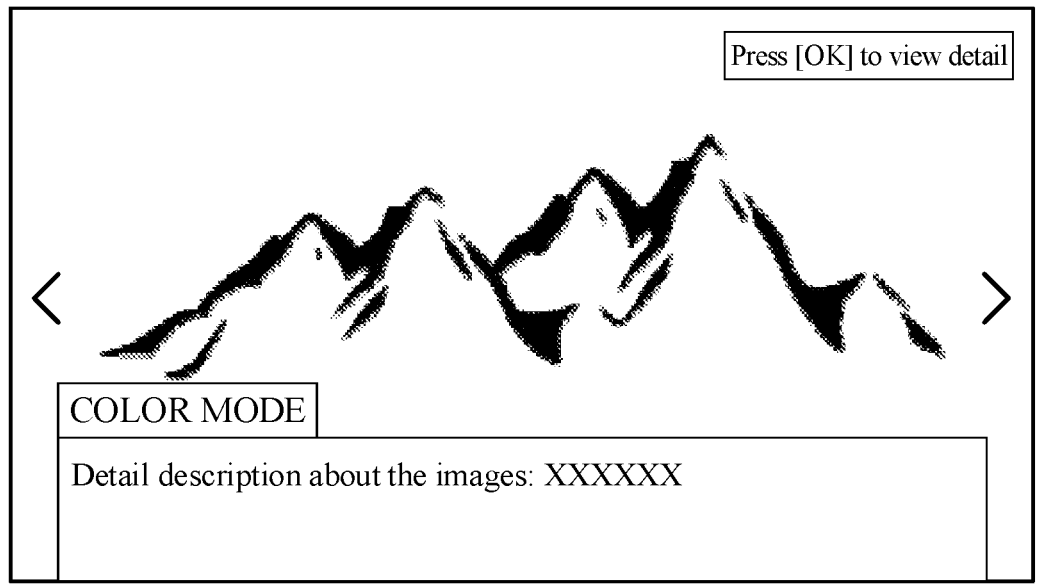
FIG. 25 illustrates a schematic diagram of another user interface according to some embodiments.

For example, when the key "right" is pressed by the user, the interface is changed from FIG. 24 to FIG. 25. Certainly, the interface displayed as FIGS. 22 and 13 may also be changed into FIG. 25. On the basis of the FIG. 25, in response to user pressing of the key "left", the interface is changed from FIG. 25 to FIG. 22.

In the embodiments of the present application, only one picture and the corresponding text content thereof exist on the interface at the same time. When the user loses interest in the picture, the control device may be operated to directly change the interface, therefore it is convenient for the user to select desired content. In addition, since only one picture and the corresponding text content thereof exist on the interface, the interface rendering speed is increased, and waiting time of the user is shortened. In the embodiments of the present application, the operation of skipping to an interface that corresponds to the other pictures may be realized by data binding of vue.js. The vue.js is a progressive framework that constructs a data-driven web interface. During use of the vue.js, only the currently displayed pictures and text data need to be controlled. When the user changes the interface, only the corresponding picture and text data need to be changed. After the vue.js monitors data change, corresponding parts in the interface will be rendered again.

For example, when the key "left" on the control device is pressed by the user and if the current picture is the first picture in the picture queue, nothing will be done. If not, the picture and text data are changed into corresponding data of the previous picture. When the vue.js monitors the data change, the corresponding parts in the interface will be rendered again, wherein the text field is located on the edge of the picture.

For example, when the key "right" on the control device is pressed by the user and if the current picture is the last picture in the picture queue, nothing will be done. If not, the picture and text data are changed into corresponding data of the last picture. When the vue.js monitors the data change, the corresponding parts in the interface will be rendered again, wherein the text field is located on the edge of the picture.

In the embodiments of the present application, the pictures and the text contents may be displayed on the same screen. Through the layout manner, novel picture display experience is brought to the user. Thanks to the semitransparent text field, text messages may be clearly identified by the user, and user viewing of the picture contents is not obstructed. Mutual reference may be formed with the picture contents when the user reads the text, and the user is free from frequently scrolling the screen for respectively viewing the pictures and the text contents, thereby effectively reducing user's operation frequency of the control device. The user may conveniently skip a certain paragraph at their own will and change the content viewing order. Thus, improved user experience is provided for the user.

In some embodiments, key prompt messages are displayed on the pictures.

For example, as shown in FIG. 22, the key prompt messages include left arrow, right arrow and key prompt for detailed content display. When the picture queue includes multiple pictures and the currently displayed picture is neither the first picture, nor the last picture, the left arrow and the right arrow are displayed on the user interface. For another example, when the picture queue includes multiple pictures and the currently displayed picture is the last picture, the left arrow is displayed on the user interface. When the picture queue includes multiple pictures and the currently displayed picture is the first picture, the right arrow is displayed on the user interface. The key prompt for detailed content display is displayed as "Press [OK] to view detail", as shown in FIG. 22. When the key "OK" is pressed, the user interface will skip to content associated with the currently displayed content.

In some embodiments, when an area of the fully displayed text contents is larger than the area of the text field, a progress bar is further displayed on the text field. When the text field is in an enlarged display state, the text contents cannot be fully displayed on the text field at a time, and the progress bar is further displayed on the text field, as shown in FIG. 23.

In some embodiments, a user interface display method and a display apparatus are provided, for improving user's experience. The method includes: receiving a control signal for indicating display of image and text data input via the user input interface; displaying the image and text data on the display in response to user input, wherein the image and text data includes picture and text content; displaying the picture according to an original size; displaying the text content in a text field; and displaying the text field on the picture.

Embodiment III

In some embodiments, various applications of different types may be configured in the display apparatus. After the display apparatus is started, the various applications are displayed in a home page of the display in lists. To ensure that the user can know related information of a certain application when the application is selected to be started, the display apparatus may perform media resource recommendation for the user when the application is selected by the user, and recommend media resources associated with the application to the user.

Figure 26:
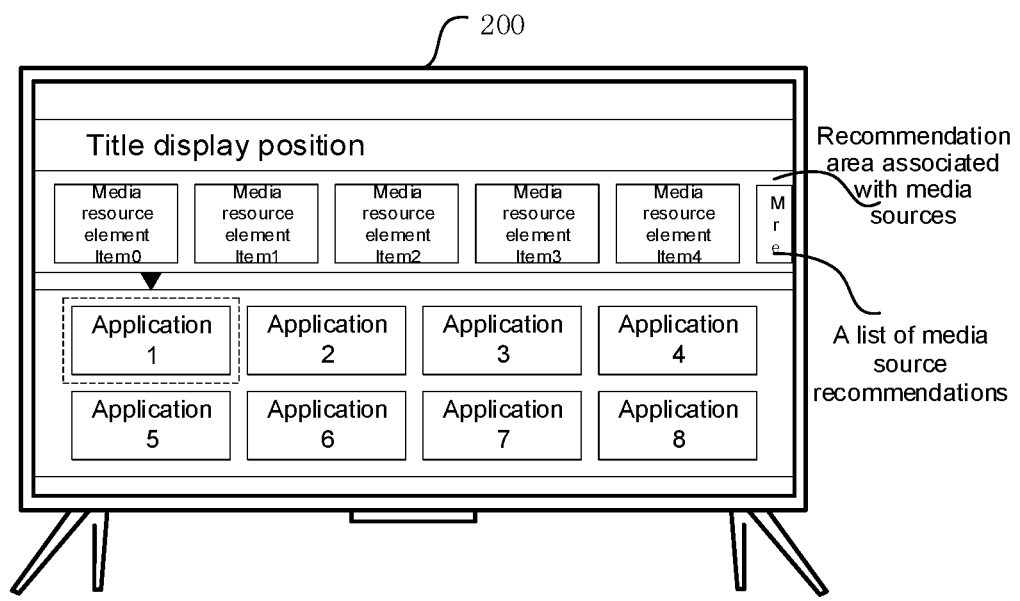
FIG. 26 illustrates a schematic diagram of a media resource recommendation page according to some embodiments.

FIG. 26 illustrates a schematic diagram of a media resource recommendation page according to some embodiments. Referring to FIG. 26, for example, if a selection focus is moved to an application 1 by the user, media resources associated with the application 1 are displayed in a recommendation area above the application; and when the selection focus is moved to an application 2, media resources associated with the application 2 are displayed in the recommendation area.

During media resource recommendation, sources of media resources or types of the media resources and other information are generally identified by list titles. If the types and sources of media resources and other information in the lists are consistent, using requirements may be met by one title. However, if the sources or types of media resources and other information in the lists are different, the media resource information cannot be accurately distinguished by only one title, and accurate prompt messages cannot be presented for the user.

For example, in a multi-title scenario, it is desired that, historical view records of the user need to be displayed, and recommended movies and television drama will be displayed to the user in a list. For two very different media resource data, it definitely needs two titles for distinguishing different types of resources for the user. In another multi-title scenario, a media resource provider A and a media resource provider B provide media resources of the same type, but the amount of media resources provided by the two media resource providers is very limited. It is desired that the media resources of the two media resource providers are merged and then displayed in one list. To clearly indicate the media resources for the user, the media resources need to be identified by multiple titles.

Obviously, the above scenarios cannot be realized in a traditional manner of only adopting one title. Thus, the embodiments of the present invention provide a display apparatus for executing an implementation method for dynamic display of media resource list with multiple titles. Different recommended media resources may be distinguished by multiple titles. Moreover, the titles may be dynamically displayed according to user's selections, resulting in accurate alert messages for the user.

Figure 27:
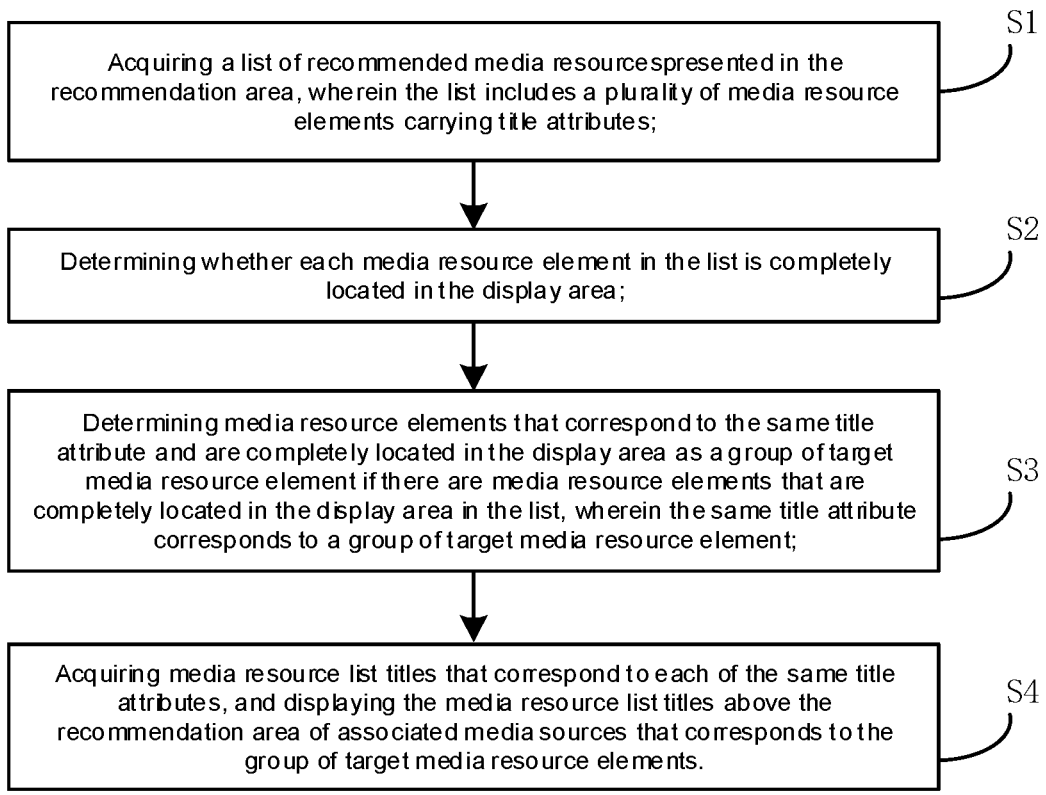
FIG. 27 illustrates a flow chart of an implementation method for dynamic display of media resource list with multiple titles according to some embodiments.

FIG. 27 illustrates a flow chart of an implementation method for dynamic display of media resource list with multiple titles according to some embodiments. The embodiments of the present invention provide a display apparatus. The display apparatus includes a display and a controller; the display is configured to display a recommendation area for associated media source and media resource list titles; the controller is connected with the display; the controller is configured to execute the implementation method for dynamic display of media resource list with multiple titles as shown in FIG. 27. The implementation method includes the following steps:

S1: a list of recommended media resources presented in the recommendation area is acquired, wherein the list includes a plurality of media resource elements carrying title attributes.

After the display apparatus is started, a home page presented in the display includes an application area and the recommendation area for associated media resource, wherein the recommendation area is located above the application area. Various applications arranged in the form of lists are presented in the application area. The recommendation area is configured for presenting a certain media resource element associated with a certain application. When a selection focus is controlled by the user to focus on a certain application, the controller automatically generates a list of recommended media resources from the media resource elements associated with the application, and the list of recommended media resources is displayed in the recommendation area.

To conveniently display corresponding titles according to different media resource elements presented in the recommendation area, a corresponding title attribute may be added for each media resource element in advance, with one media resource element corresponding to one title attribute. The media resource elements refer to media resource data associated with a certain application. When the list of recommended media sources is generated, the media resource elements of the same title attribute are arranged together.

S2: whether each media resource element in the list is completely located in the display area is determined.

The display area of the display is the viewport of the user. Therefore, in order to be conveniently viewed for the user, the media resource list titles need to be displayed in the viewport. Moreover, in order to display the media resource list titles above the corresponding media resource elements, whether each media resource element is completely located in the display area needs to be determined.

Figure 28:
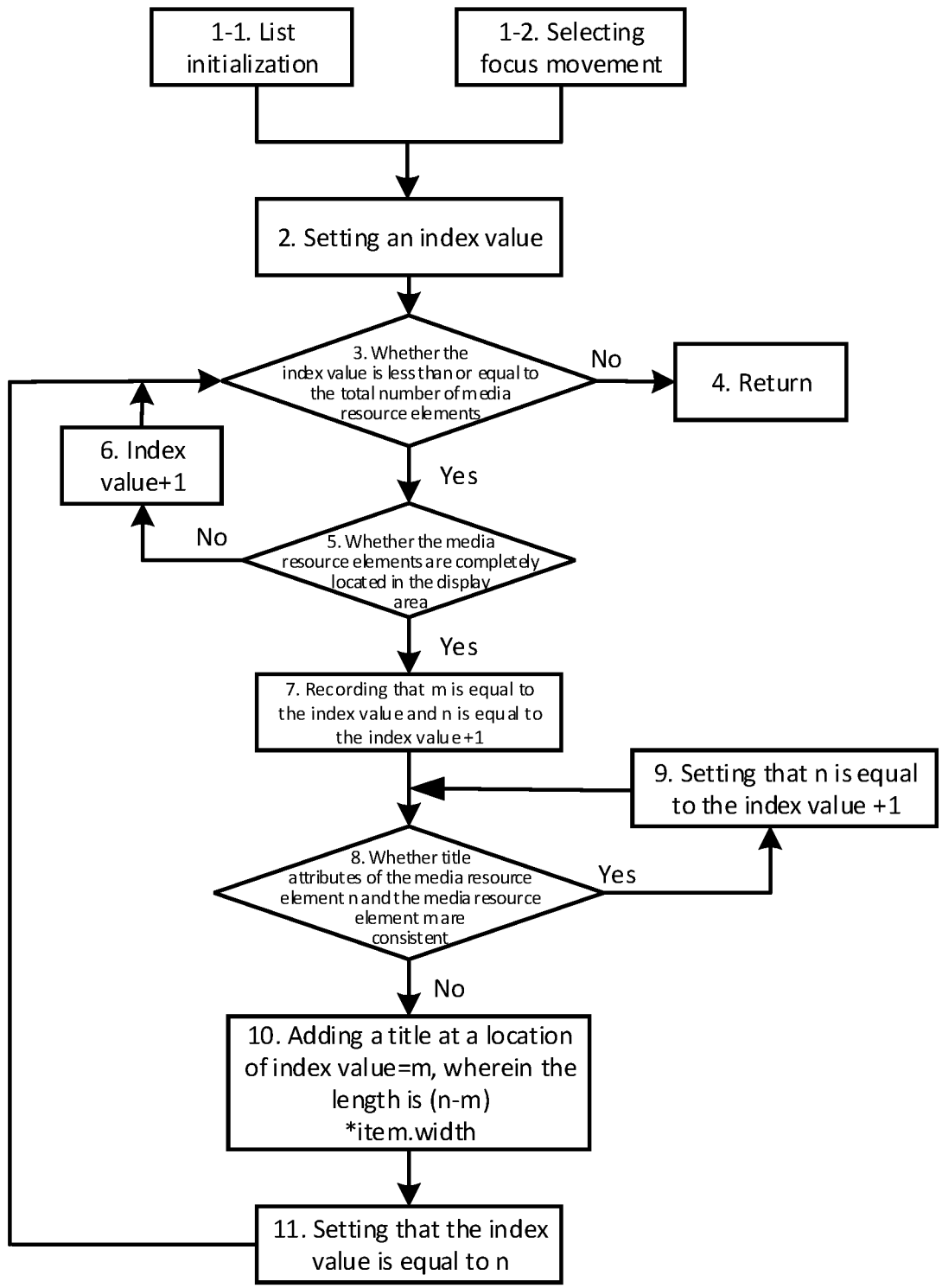
FIG. 28 illustrates a data flow diagram of dynamic display of list with multiple titles according to some embodiments.

FIG. 28 illustrates a data flow diagram of dynamic display of list with multiple titles according to some embodiments. Referring to FIG. 28, in order to accurately determine display positions of the media resource list titles, the controller is further configured to do the following process to determine whether each media resource element in the list is completely located in the display area: add a corresponding index value for each of the media resource elements according to a sort order of each media resource element in the list; and acquire an initial index value, traverse each of the index values from the initial index value, and determine whether media resource elements that correspond to each index value are completely located in the display area.

Since the list of recommended media source includes a plurality of media resource elements, to accurately display the media resource list titles above the media resource elements presented in the display area, whether each of the media resource elements is completely located in the display area needs to be traversed in order. Therefore, during list initialization or generation of selection focus movement, the index value is added for each of the media resource elements to avoid omission.

The index values are added according to a sorting order of each of the media resource elements in the list of recommended media source. The index values are sequentially added from 0, such as, 0, 1, 2, 3, . . . . When traversing starts, each of the index values is traversed in sequence from the initial index value, so as to determine whether the media resource elements that correspond to the index values are completely located in the display area.

As shown in FIG. 28, the data flow diagram of dynamic display of list with multiple titles according to some embodiments includes the following steps:

1-1. performing list initialization, and 1-2. selecting focus movement;
2. setting an index value;
3. determining whether the index value is less than or equal to the total number of media resource elements, if not, performing step 4; if yes, performing step 5;
4. return;
5. determining whether the media resource elements are completely located in the display area, if not, performing step 6; if yes, performing step 7;
6. index value+1;
7. recording that m is equal to the index value and n is equal to the index value+1;
8. determining whether title attributes of the media resource element n and the media resource element m are consistent; if yes, performing step 9; if not, performing step 10;
9. setting that n is equal to the index value+1;
10. adding a title at a location of index value=m, wherein the length is (n−m)*item.width;
11. setting that the index value is equal to n.

In some embodiments, display forms of the list of recommended media sources include but are not limited to two forms, including a complete list and a virtual list. The complete list is to display all the media resource elements in the list, wherein the real list length is a length formed by all the media resource elements; while the virtual list is to display partial media resource elements in the viewport, wherein an actual list length is a length formed by the media resource elements that correspond to the initial index value and media resource elements that correspond to a final index value.

Figure 29:
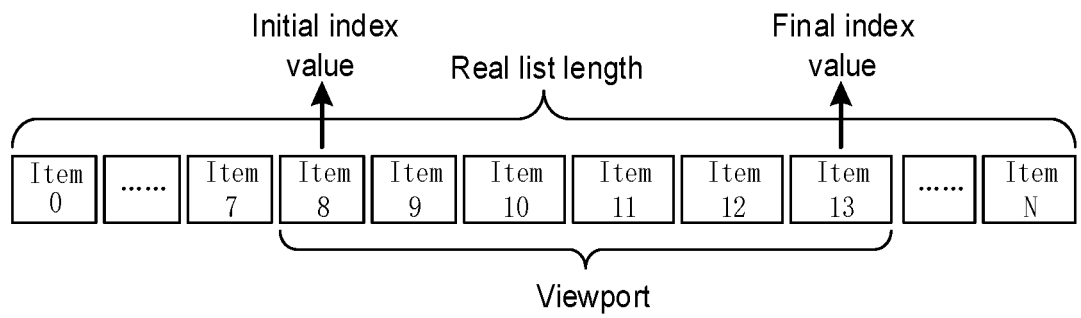
FIG. 29 illustrates a schematic diagram for presenting a media resource recommendation list according to some embodiments.

FIG. 29 illustrates a schematic diagram of display of the list of recommended media sources according to some embodiments. Referring to FIG. 29, if the list of recommended media sources includes N media resource elements such as Item0-ItemN, the media resource elements displayed in the complete list are the Item0-ItemN. If only 6 media resource elements may be simultaneously displayed in the viewport, media resource elements displayed in the virtual list are Item8-Item13 as shown in FIG. 29.

Therefore, based on the different forms of the list, the determined media resource elements that correspond to the initial index value are different. In some embodiments, when the list is a complete list, while the acquiring the initial index value, the controller is further configured to: acquire a media resource element ranked first in the list as an initial media resource element when the list is a complete list; and determine an index value that corresponds to the initial media resource element as the initial index value.

When the list is a complete list, the traversing operation needs to start from the first media resource element, i.e., the media resource element ranked first in the list serves as the initial media resource element. The corresponding index value is determined as the initial index value.

For example, if the first media resource element in the complete list is Item0, the index value of the first media resource element Item0 is set as the initial index value.

In some embodiments, when the list of recommended media source is a virtual list, while the acquiring the initial index value, the controller is further configured to: acquire media resource elements of the list of recommended media source located in the viewport when the list of recommended media source is a virtual list, wherein the virtual list refers to a list where partial media resource elements are displayed in the viewport; and determine an index value of the media resource element ranked first in the viewport as an initial index value.

When the list of recommended media source is a virtual list, the traversing operation starts from the first media resource element in the current viewport, i.e., the media resource element ranked first in the viewport serves as the initial media resource element. The corresponding index value is determined as the initial index value.

For example, if the first media resource element in the virtual list is Item8, the index value of the first media resource element Item8 is set as the initial index value.

After the media resource elements that correspond to the initial index value is determined, whether the media resource elements are completely located in the display area is determined in sequence. In some embodiments, while the determining whether the media resource elements that correspond to each index value are completely located in the display area, the controller is further configured to: acquire each pixel coordinate value of the media resource elements that correspond to the index value and a coordinate area range of the display area; determine that the media resource elements are not completely located in the display area if all pixel coordinate values of the media resource elements are not completely located in the coordinate area range; and determine that the media resource elements are completely located in the display area if all the pixel coordinate values of the media resource elements are completely located in the coordinate area range.

When determining whether the media resource elements are completely located in the display area, whether the visible portion of the media resource elements is completely displayed is calculated. The media resource elements are displayed in the list of recommended media sources in the form of thumbnail. Therefore, whether the media resource elements are completely located in the display area may be determined according to pixel coordinates of the media resource elements.

Each of the media resource elements corresponds to a thumbnail. A thumbnail comprises a plurality of pixels. A coordinate value of each of the pixels in the thumbnail is acquired. A coordinate system is established for the page presented in the display. The display area may serve as the viewport of the page. The coordinate area range of the display area may be determined based on the coordinate system.

Each pixel coordinate value that corresponds to each media resource element is compared with the coordinate area range of the display area. If all the pixel coordinate values of a specified media resource element are located in the coordinate area range, it is indicated that the specified media resource element is located in the viewport, i.e., it is determined that the media resource element is completely located in the display area.

If partial pixel coordinate values of the specified media resource element are located in the coordinate area range, and the rest pixel coordinate values are not located in the coordinate area range, it is indicated that a partial area of the specified media resource element goes beyond the display area, and it is determined that the media resource element is not completely located in the display area. On the other hand, if all the pixel coordinate values of the specified media resource element are not located in the coordinate area range, it is indicated that the specified media resource element completely goes beyond the display area, and it is determined that the media resource element is not located in the display area.

Figure 30:
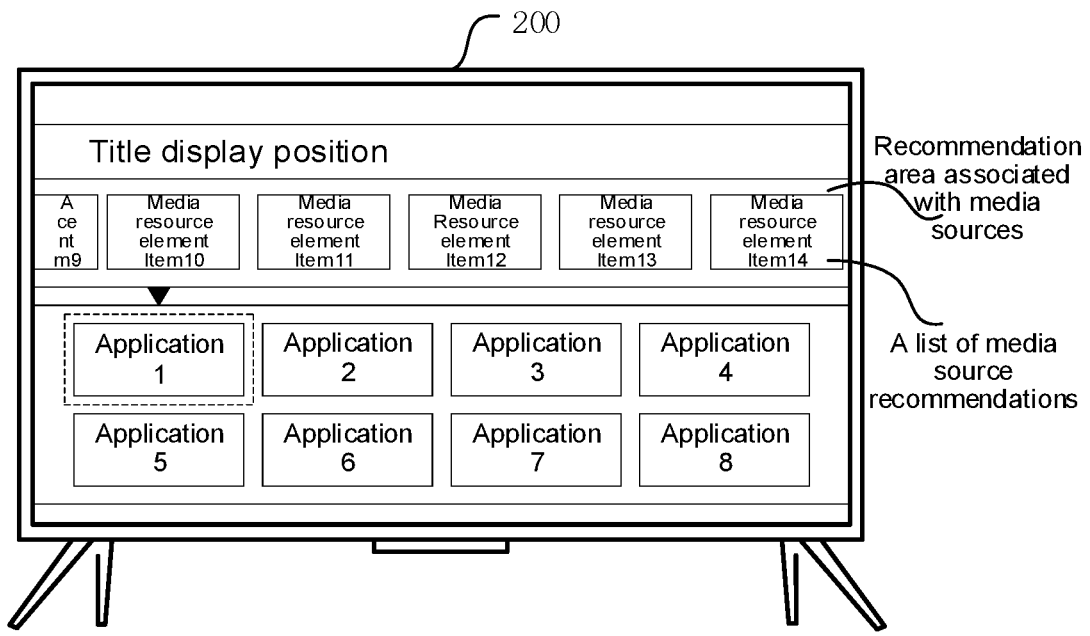
FIG. 30 illustrates a drawing of the media resource elements where they are not completely located in a display area according to some embodiments.

FIG. 30 illustrates an effect drawing of media resource elements that are not completely located in the display area according to some embodiments. Referring to FIG. 30, only a portion of a media resource element Item9 is located in the display area, and then it is determined that the media resource element Item9 is not completely located in the display area. All areas of a media resource element Item10 are located in the display area, and then it is determined that the media resource element Item10 is completely located in the display area. However, the media resource element Item8 has completely disappeared from the display area, and then it is determined that the media resource element Item8 is not located in the display area.

When the user controls a selection focus to move to each media resource element in the list, the media resource elements move towards the left in sequence along with rightward movement of the selection focus since only partial media resource elements may be displayed in the display area. Then, media resource elements that rank ahead will disappear in the display area from the left side in sequence. Similarly, the media resource elements move towards the right in sequence along with leftward movement of the selection focus; and then media resource elements that rank behind will disappear in the display area from the right side in sequence.

When the user controls the selection focus to move once, positions of media resource elements that can be seen in the list are changed. Therefore, whether the current media resource elements that can be seen are completely located in the display area needs to be determined after movement each time, thereby accurately determining positions of media resource elements of which media resource list titles need to be displayed.

S3: media resource elements that correspond to the same title attribute and are completely located in the display area are determined as a group of target media resource element if there are media resource elements that are completely located in the display area in the list, wherein the same title attribute corresponds to a group of target media resource elements.

Multiple media resource elements that are completely located in the display area will be traversed when each of the media resource elements is traversed in sequence based on the initial index values acquired in the above two manners to determine whether the media resource elements are completely located in the display area. If the currently traversed media resource elements are completely located in the display area, numbers of the media resource elements are accumulated, and the media resource elements are continuously traversed based on the next index value.

Since the media resource elements of the same title attribute are arranged together when the list of recommended media source is generated, the title attributes that correspond to all traversed media resource elements located in the display area completely will have clear distinctions. The media resource elements of the same title attribute are determined as a group of target media resource elements. In other words, the media resource elements that are completely located in the display area may form multiple group of target media resource elements, and one group of target media resource elements corresponds to one title attribute, i.e., the title attribute of each media resource element in one group is the same.

If there are many media resource elements of the same title attribute, the multiple media resource elements of the same title attribute may be displayed in the display area; and if there are just several media resource elements of the same title attribute, multiple media resource elements of different title attributes may be displayed in the display area. Therefore, to perform accurate recommendation list title display, during traversing by utilizing the index value, the condition for ending traversing may be as follows: the next title attribute is traversed, or the next traversed media resource element is not completely located in the display area, i.e., the group of target media resource elements in which the recommendation list titles need to be displayed is determined based on characteristics of the title attributes of the media resource elements displayed in the display area.

In some embodiments, when the condition for ending traversing is that the next traversed media resource element is not completely located in the display area, while the determining media resource elements that correspond to the same title attribute and are completely located in the display area as a group of target media resource elements if the media resource elements that are completely located in the display area exist in the list of recommended media source, the controller is further configured to: determine the target media resource elements as initial media resource elements in the list of recommended media source if the target media resource elements are completely located in the display area; determine a next media resource element as a final media resource element if a corresponding next media resource element having the same title attribute as the target media resource element is not completely located in the display area; and acquire all the media resource elements included from the initial media resource element to the final media resource element, and determine all the media resource elements as a group of target media resource elements that corresponds to the same title attribute.

When each of the media resource elements is traversed in sequence based on the index value, whether the index value is less than or equal to the total quantity of the media resource elements is determined. If the index value is less than or equal to the total quantity of the media resource elements, a subsequent index value traversing process is continued; and if the index value is greater than the total quantity of the media resource elements, an error will occur, and the flow goes back to an initial state. The total quantity of the media resource elements refers to a quantity of media resource elements that can be seen simultaneously. If the list of recommended media source is a complete list, the total quantity of the media resource elements is a total number of all media resource elements in the complete list; and if the list of recommended media source is a virtual list, the total quantity of the media resource elements is a total number of media resource elements in the viewport.

During traversing based on the index value, if a certain media resource element is completely located in the display area, the firstly traversed target media resource element serves as an initial media resource element m, 1 is added to the index value n, and the next media resource element is traversed. If the present media resource element and the initial media resource element have the same title attribute, whether the media resource element is completely located in the display area is determined. If the media resource element is completely located in the display area, 1 is added to the index value n again, and the next media resource element is traversed. If the media resource element is not completely located in the display area, an initial index value is reset, i.e., an index value of the media resource element that is not completely located in the display area serves as the initial index value. Then, the n corresponds to the next title attribute, and subsequent media resource elements are continuously traversed, and so on.

If the next media resource element having the same title attribute as the target media resource element is not completely located in the display area, the current traversing process is terminated. Then, the index value n is accumulated to the index value that corresponds to the next media resource element; and the media resource element is determined as the final media resource element n. All media resource elements between the initial media resource element m and the final media resource element n have the same title attributes. Therefore, all the media resource elements are determined as a group of target media resource element that corresponds to the same title attribute. The length of the group of target media resource elements is (n−m)*Item.width, and Item.width refers to a theoretical length of each media resource element.

In other words, when the list of recommended media sources moves towards left, although the rightmost media resource element in the display area is not completely located in the display area, the title attribute of the rightmost media resource element is the same as that of the previous media resource element, and then the media resource element serves as the final media resource element. Thus, the length of the group of target media resource elements is a length formed from the initial media resource element to the rightmost boundary of the display area.

Figure 31:
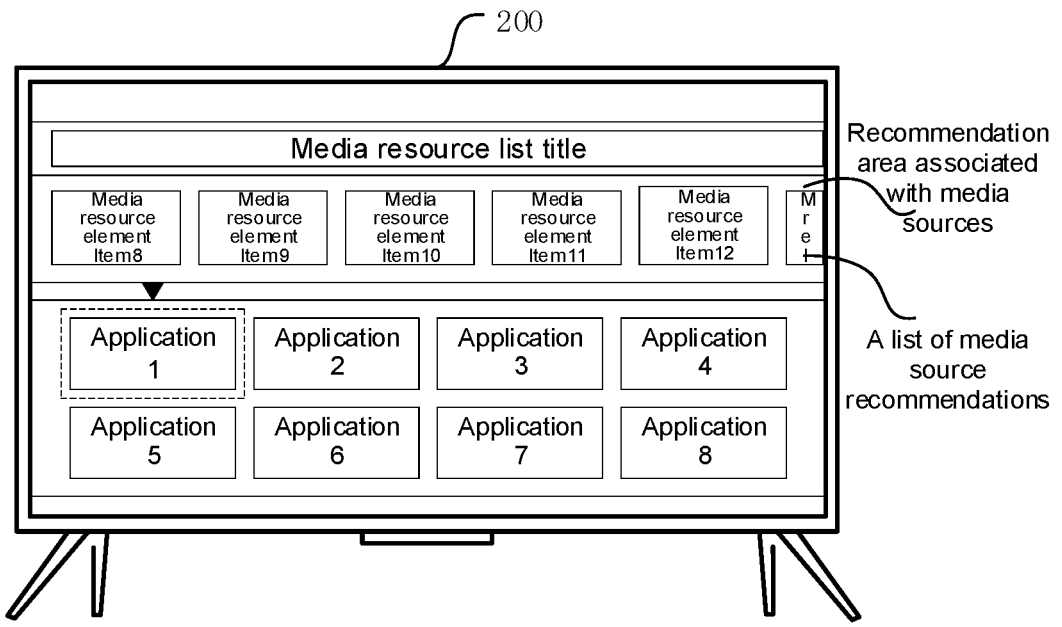
FIG. 31 illustrates a schematic diagram of determining target media resource element group according to some embodiments.

FIG. 31 illustrates a schematic diagram of determining a group of target media resource elements according to some embodiments. For example, if there are many media resource elements corresponding to a certain title attribute, a condition that only media resource elements that correspond to the title attribute are displayed in the display area will occur, i.e., only one media resource list title is displayed in the display area. In this case, referring to FIG. 31, if the media resource element Item8 that is completely located in the display area is traversed in the display area, 1 is added to the index value, and the media resource element Item9 is continuously traversed. If the media resource element Item9 is completely located in the display area, 1 is added to the index value again, and the media resource element Item10 is continuously traversed, and so on. If the traversed media resource element Item13 is not completely located in the display area, the media resource element Item13 serves as the final media resource element. Then, the group of target media resource elements includes 6 media resource elements from media resource elements Item8 to Item13. Moreover, the 6 media resource elements have the same title attribute, and the length of the group of target media resource elements is a length formed from the Item8 to the rightmost boundary of the display area.

In some embodiments, when the condition for ending traversing is that the next title attribute is traversed, while determining media resource elements that correspond to the same title attribute and are completely located in the display area as a group of target media resource elements if media resource elements that are completely located in the display area exist in the list of recommended media source, the controller is further configured to: determine the target media resource elements as initial media resource elements in the list of recommended media source if the target media resource elements are completely located in the display area; compare the title attribute of the next media resource element that is completely located in the display area with the title attribute of the initial media resource element, and determine a previous media resource element of media resource elements that generates inconsistent title attributes as a final media resource element if the title attributes of the next media resource element that is completely located in the display area are inconsistent with the title attribute of the initial media resource element; and acquire all the media resource elements included from the initial media resource element to the final media resource element, and determine all the media resource elements as a group of target media resource elements that corresponds to the same title attribute.

When each of the media resource elements is traversed in sequence based on the index value, if a certain media resource element is completely located in the display area, the firstly traversed media resource element serves as the initial media resource element m, 1 is added to the index value n, and the next media resource element is traversed. The title attribute of the next media resource element that is completely located in the display area is compared with the title attribute of the initial media resource element. If the comparison result is the same, it is indicated that the next media resource element and the initial media resource element have the same title attribute. The media resource elements may be identified by utilizing the same media resource list title. Then, 1 is added to the index value n again; and the next media resource element that is completely located in the display area is traversed, and so on.

If the title attribute of the next media resource element that is completely located in the display area is inconsistent with the title attribute of the initial media resource element, the current traversing process is stopped. Then, the index value n is accumulated to the index value that corresponds to the next media resource element; and the pervious media resource element of the media resource element is determined as a final media resource element n−1. All media resource elements between the initial media resource element m and the final media resource element n−1 have the same title attributes. Therefore, all the media resource elements are determined as a group of target media resource elements that corresponds to the same title attribute. The length of the group of the target media resource elements is (n−m)*Item.width, and Item.width refers to the theoretical length of each media resource element.

However, when the list of recommended media source moves towards the left, although the rightmost media resource element in the display area is not completely located in the display area, the title attribute of the rightmost media resource element is the same as that of the previous media resource element, and then the media resource element serves as the final media resource element. Thus, the length of the group of target media resource elements is the length formed from the initial media resource element to the rightmost boundary of the display area.

Figure 32:
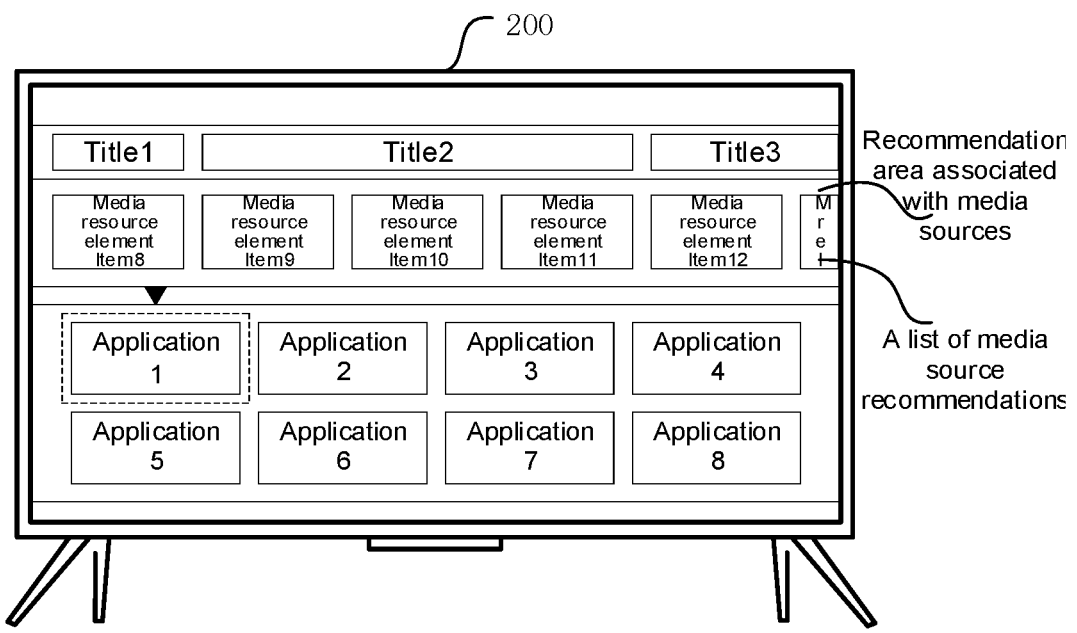
FIG. 32 illustrates another schematic diagram of determining a target media resource element group according to some embodiments.

FIG. 32 illustrates another schematic diagram of determining a group of target media resource elements according to some embodiments. For example, if there are just a few media resource elements that correspond to a certain title attribute, a scenario where multiple media resource list titles are displayed in the display area will occur. In this case, referring to FIG. 32, if the media resource element Item8 that is completely located in the display area is traversed in the display area, the title attribute of the media resource element Item8 is A, 1 is added to the index value, and the media resource element Item9 is continuously traversed. If the traversed media resource element Item9 is completely located in the display area, but the title attribute of the media resource element Item9 is B and is inconsistent with that of the Item8, the previous media resource element Item8 of the media resource element Item9 serves as the final media resource element. Then, the initial media resource element and the final media resource element are the same media resource element Item8. Therefore, the group of target media resource elements only includes one media resource element Item8. The media resource element Item8 corresponds to the title attribute A; the title attribute A corresponds to the title 1; and the length of the group of target media resource elements is a length formed by the media resource element Item8.

The media resource element Item10 is continuously traversed according to the above method. Then, the media resource element Item9 is an initial media resource element of another title attribute B. If the media resource element Item10 is completely located in the display area and the title attribute of the media resource element Item10 is the same as that of the media resource element Item9, 1 is added to the index value, and the media resource element Item11 is continuously traversed, and so on. If the traversed media resource element Item12 is completely located in the display area, but with a title attribute C that is inconsistent with the title attribute of the Item9, the previous media resource element Item11 of the media resource element Item12 serves as the final media resource element. Then, the group of target media resource elements includes 3 media resource elements included in media resource elements Item9 to Item11. Moreover, the 3 media resource elements have the same title attributes that are all the title attribute B. The title attribute B corresponds to the title 2, and the group length of the target media resource element is a length formed from the media resource element Item9 to the media resource element Item11.

The media resource element Item13 is continuously traversed according to the above method. Then, the media resource element Item12 is an initial media resource element of another title attribute C. If the title attribute of the media resource element Item13 is the same as that of the Item12, but the Item13 is not completely located in the display area, the media resource element Item13 serves as the final media resource element. Then, the group of target media resource elements includes two media resource elements of Item12 and Item13. Moreover, the 2 media resource elements have the same title attributes that both correspond to the title attribute C. The title attribute C corresponds to the title 3, and the length of the group of target media resource elements is a length formed from the Item12 to the rightmost boundary of the display area.

Obviously, under a condition that the traversed media resource elements are completely located in the display area, if the title attribute serves as a characteristic for distinguishing the media resource elements, the multiple media resource elements displayed in the display area may be divided into multiple groups of target media resource elements with each group respectively corresponding to one title attribute. Further, the media resource elements may be further divided according to the title attribute, so as to perform accurate media resource list title display.

S4: media resource list titles that correspond to each of the same title attributes are acquired, and the media resource list titles are displayed above the recommendation area associated with media sources that corresponds to the group of target media resource elements.

The multiple groups of target media resource element are determined according to any manner provided by the above embodiments. Each group of target media resource elements corresponds to one title attribute, while each title attribute corresponds to one media resource list title. To identify the corresponding media resource elements by utilizing the media resource list titles, the media resource list titles are displayed above the target media resource element group, that is, above a corresponding position of the recommendation area. The front end of the display position of the media resource list titles is aligned at the front end of a display position of the first media resource element in the target media resource element group. The rear end of the display position of the media resource list titles is aligned at the rear end of a display position of the last media resource element in the target media resource element group.

Display of the media resource list titles dynamically moves along with the positions of the media resource elements in the display area, i.e., when the positions of the media resource elements in the display area are changed by controlling the selection focus to move on the list of recommended media sources by the user, each of the list titles is dynamically adjusted, so as to ensure that the position of each of the media resource titles is consistent with position display of the respectively corresponding media resource elements, thereby accurately distinguishing different types of media resource information by virtue of display of the media resource titles.

In some embodiments, to dynamically adjust each of the media resource list titles according to the positions of the corresponding media resource elements, while executing the operation of displaying the media resource list titles above the recommendation area associated with media resources that corresponds to the group of target media resource elements, the controller is further configured to: determine a title display position above the recommendation area associated with media resources based on a display position of the group of target media resource elements; and display the media resource list titles at the title display position.

In some embodiments, the media resource list titles are displayed above the recommendation area, so as to identify each media resource element in the recommendation area. Therefore, the title display position may be determined above the recommendation area based on the display position of each target media resource element in the group in the recommendation area.

Specifically, while executing the operation of determining the title display position above the recommendation area based on the display position of the group of target media resource elements, the controller is further configured to: acquire an initial position of an initial media resource element and a final position of a final media resource element in the group of target media source; take the initial position of the initial media resource element as an initial position of the title display position, and take the final position of the final media resource element as a final position of the title display position; and determine the title display position above the recommendation area based on the initial position of the title display position and the final position of the title display position.

Each group of target media resource elements includes at least one media resource element. Therefore, the display position of the group of target media resource elements in the recommendation area may be defined according to the positions of the initial media resource element and the final media resource element. To enable the positions of the media resource list titles to be consistent with position display of the respectively corresponding media resource elements, the initial position of the initial media resource element that corresponds to an upper area of the recommendation area is taken as an initial position of the title display position; and the final position of the final media resource element that corresponds to the upper area of the recommendation area is taken as a final position of the title display position. If the final media resource element is not completely located in the display area, the rightmost boundary position of the display area serves as the final position of the final media resource element.

Therefore, the title display position may be determined above the recommendation area according to the initial position of the title display position and the final position of the title display position. A width of the title display position is defined by the position of the initial media resource element and the position of the final media resource element in the corresponding group of target media resource elements. In other words, the title display position corresponds to an area formed by N media resource elements, wherein N is an integer number.

Each of the media resource list titles is displayed at the corresponding title display position. The media resource list titles have display length the same as the length of an area formed by the group of target media resource elements, and have corresponding positions. Therefore, the positions of the media resource list titles may be consistent with position display of the respectively corresponding media resource elements.

In an example where a user moves the selection focus to the application 1, the title attributes that correspond to various media resource elements in the generated media resource recommendation list include: account entry, historical viewing records and hot recommendations. According to a method for dividing the media resource elements based on the title attributes and determining the media resource list titles in the above embodiments, a media resource list title 1 that corresponds to a title attribute "account entry" is determined, and the corresponding media resource element is Item0; a media resource list title 2 that corresponds to a title attribute "historical viewing records" is determined, and corresponding media resource elements are Item1, Item2 and Item3; and a media resource list title 3 that corresponds to a title attribute "hot recommendation" is determined, and the corresponding media resource element is Item4. In other words, 5 media resource elements may be completely displayed in the display area simultaneously.

Figure 33:
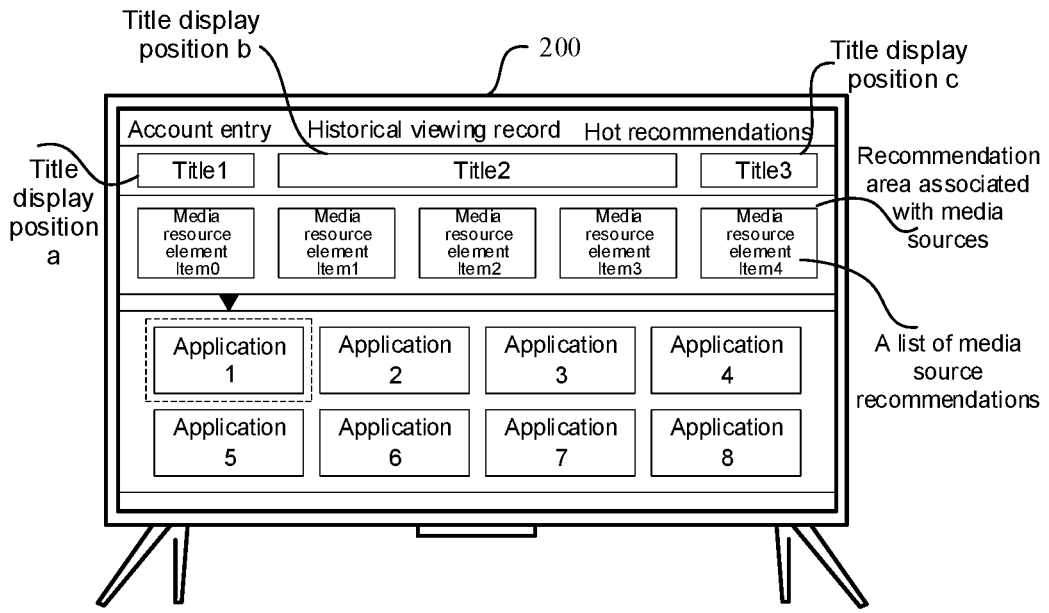
FIG. 33 illustrates a state diagram of multi-title dynamic display according to some embodiments.

FIG. 33 illustrates a state diagram of dynamic display of multiple titles according to some embodiments. Referring to FIG. 33, at an initial moment, the media resource element Item0 (a first media resource element group) that corresponds to the title attribute "account entry" is completely located in the display area, then a title display position a is determined above the recommendation area based on the display position of the media resource element Item0, and the media resource list title 1 is displayed at the title display position a. Obviously, the display length of the media resource list title 1 is the same as a length of an area occupied by the media resource element Item0, and the positions correspond to each other. The media resource elements such as Item1, Item2 and Item3 (a second media resource element group) that correspond to the title attribute "historical viewing records" are completely located in the display area, then a title display position b is determined above the recommendation area based on the display positions of the media resource elements Item1, Item2 and Item3, and the media resource list title 2 is displayed at the title display position b. Obviously, the display length of the media resource list title 2 is the same as a length of an area occupied by the media resource elements Item1, Item2 and Item3, and the positions correspond to each other. The media resource element Item4 (a third media resource element group) that corresponds to the title attribute "hot recommendation" is completely located in the display area, then a title display position c is determined above the recommendation area based on the display position of the media resource element Item4, and the media resource list title 3 is displayed at the title display position c. Obviously, the display length of the media resource list title 3 is the same as a length of an area occupied by the media resource element Item4, and the positions correspond to each other.

Figure 34:
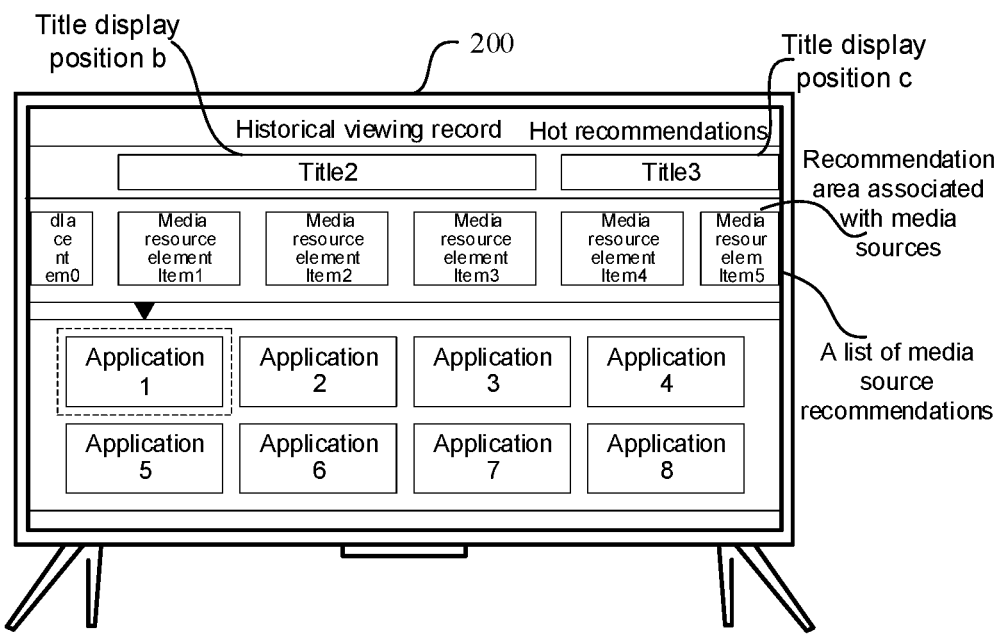
FIG. 34 illustrates another state diagram of multi-title dynamic display according to some embodiments.

FIG. 34 illustrates another state diagram of dynamic display of multiple titles according to some embodiments. Referring to FIG. 34, if the user controls the selection focus to move towards right in the media resource recommendation list, various media resource elements displayed in the recommendation area are moved towards left. If the media resource element Item0 that corresponds to the title attribute "account entry" goes beyond the display area, the corresponding media resource list title 1 disappears. However, during leftward movement, the media resource elements Item1, Item2 and Item3 that correspond to the title attribute "historical viewing records" are still completely located in the display area; only the display positions are changed; and then, the display position of the corresponding media resource list title 2 moves accordingly. Along with the leftward movement, a media resource element Item5 that corresponds to the title attribute "hot recommendation" may be seen; the media resource element Item5 is partially located in the display area; then the group of target media resource elements that corresponds to the title attribute "hot recommendation" includes the media resource elements Item4 and Item5; and the corresponding media resource list title 3 corresponds to the display positions of the media resource elements Item4 and Item5.

Figure 35:
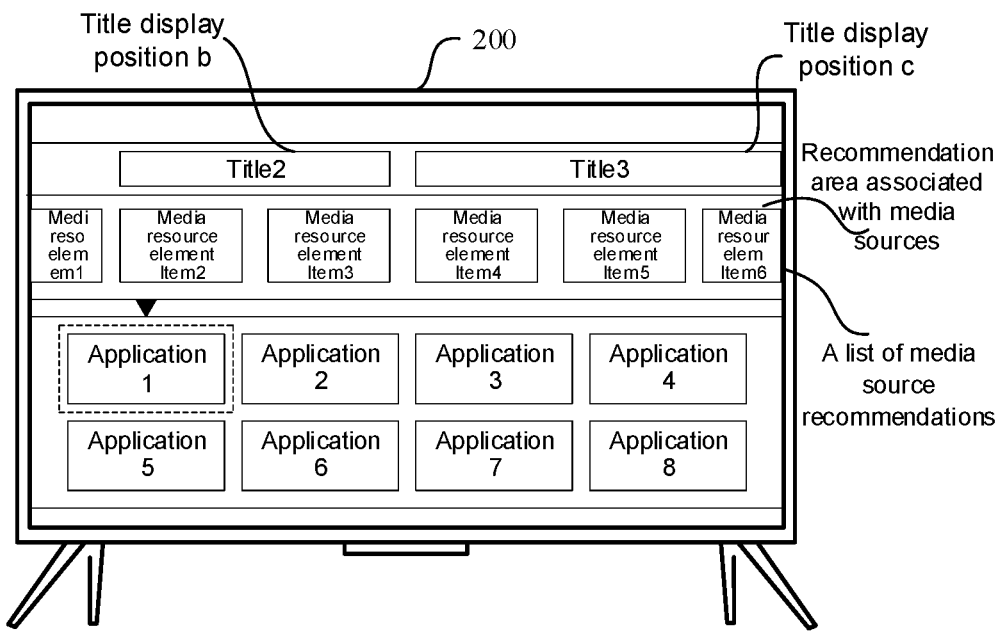
FIG. 35 illustrates another state diagram of multi-title dynamic display according to some embodiments.

FIG. 35 illustrates another state diagram of dynamic display of multiple titles according to some embodiments. Referring to FIG. 35, if the user controls the selection focus to continuously move towards right in the media resource recommendation list, the various media resource elements displayed in the recommendation area are continuously moved towards left. If the media resource element Item1 that corresponds to the title attribute "historical viewing records" goes beyond the display area, and only the media resource elements Item2 and Item3 are still completely located in the display area, the display position of the corresponding media resource list title 2 is moved and displayed along with the media resource elements Item2 and Item3 only, i.e., the display length of the media resource list title 2 is the same as the length of the area occupied by the media resource elements Item2 and Item3; and the positions correspond to each other. Along with the leftward movement, media resource elements Item5 and Item6 that correspond to the title attribute "hot recommendation" can be seen; the media resource element Item5 is completely located in the display area; and the Item6 is partially located in the display area. Then, a target media resource element group that corresponds to the title attribute "hot recommendations" includes media resource elements Item4, Item5 and Item6; and the display position of the corresponding media resource list title 3 is defined based on the media resource elements Item4, Item5 and Item6. The position of the Item6 is determined based on the right boundary of the display area, i.e., the display length of the media resource list title 3 is the same as a length of an area occupied by the media resource elements Item4, Item5 and Item6; and the positions correspond to one another.

It can be seen that, along with movement of the selection focus on the media resource recommendation list, the positions of the media resource elements displayed in the recommendation area are changed; the display length of the media resource list titles is consistent with the occupied length of the corresponding group of target media resource elements in the display area; and the positions of the media resource list titles may be consistent with the position display of the respectively corresponding media resource elements. Therefore, the multiple titles are dynamically displayed in the media resource recommendation list; and the media resource information of different media resource sources or different media resource types may be accurately distinguished in the multi-title display manner, thereby bringing accurate prompt messages to the user for convenient view, and better user experience.

In some embodiments, if a title attribute corresponds to too many media resource elements, and the media resource elements cannot be simultaneously displayed in the viewport, the plurality of media resource elements of the title attribute may be displayed in the media resource recommendation list. Further, a button displayed and viewed in the last item of the target media resource element group. Based on the operation of viewing the button and setting deep links, the button is clicked, and the device may skip to a corresponding deep link interface. All the media resource elements under the title attribute are displayed on the interface. When the user controls the selection focus to move to the last item of the title attribute, the user is guided to view more media resource elements.

It can be known from the above that, according to the display apparatus in the embodiments of the present invention, the controller is configured to: acquire the media resource recommendation list presented in the recommendation area associated with media source; determine whether each media resource element in the media resource recommendation list is completely located in the display area; determine media resource elements that correspond to the same title attribute and are completely located in the display area as a group of target media resource element group if media resource elements that are completely located in the display area exist in the media resource recommendation list; acquire media resource list titles that correspond to each of the same title attributes, and display the media resource list titles above the recommendation area that corresponds to the group of target media resource elements. It can be seen that, according to the display apparatus in the embodiments of the disclosure, the media resource elements are distinguished according to the title attributes; and the media resource list titles that correspond to each title attribute are displayed on the corresponding media resource elements. The display length of the media resource list titles is consistent with the occupied length of the corresponding group of target media resource elements in the display area; and the display positions are changed along with changes of the positions of the media resource elements. Further, the position of each media resource list title may be consistent with the position display of the respectively corresponding media resource element; the dynamic display of multiple titles is realized; and the media resource information of different media resource sources or different media resource types may be accurately distinguished, thereby bringing accurate prompt messages to the user for convenient view, and better user experience.

FIG. 27 illustrates a flow chart of the implementation method for dynamic display of media resource list with multiple titles according to some embodiments. Referring to FIG. 27, the implementation method for dynamic display of media resource list with multiple titles in the embodiments of the present disclosure is executed by the controller configured in the display apparatus provided in the above embodiments. The method includes:

acquiring a media resource recommendation list presented in a recommendation area associated with media sources, wherein the media resource recommendation list includes a plurality of media resource elements carrying title attributes;

determining whether each media resource element in the media resource recommendation list is completely located in the display area;

determining media resource elements that correspond to the same title attribute and are completely located in the display area as a group of target media resource elements if media resource elements that are completely located in the display area exist in the media resource recommendation list, wherein the same title attribute corresponds to one group of target media resource elements; and acquiring media resource list titles that correspond to each of the same title attributes, and displaying the media resource list titles above the recommendation area that corresponds to the group of target media resource elements.

In specific implementations, the present disclosure further provides a computer storage medium. The computer storage medium may be stored programs, which, when executed, may include partial or total steps of the implementation method for dynamic display of media resource list with multiple titles in the embodiments. The storage medium may be a disk, an optical disc, a read-only memory (ROM) or a random access memory (RAM), and the like.

Finally, it should be indicated that, the above embodiments are merely configured for describing the embodiments, rather than a limitation. Although the present application is described in detail by referring to the above embodiments, those ordinary skilled in the art should understand that, the above embodiments may still be modified, or equivalents may be made to partial or total features.

For convenient explanation, the above descriptions are given in combination with specific implementation modes. However, the above discussions are not intended for limitation or to limit the embodiments to the above specific forms. Many modifications and transformations may be obtained according to the above instructions. Selection and description of the above embodiments are to better explain the principles. Thus, the above embodiments and various different embodiments suitable for specific uses are well used by those skilled in the art.

What is claimed is:

1. A display apparatus, comprising:
a display, configured for displaying an image from a broadcast system or network and/or a user interface, and a selector configured for indicating that an element is selected on the user interface, wherein the user interface comprises a viewport; and at least one virtual list is displayed in the viewport;
a user input interface, configured for receiving an input signal;
a remote control configured with one or more buttons; and
a controller in connection with the display and the user input interface respectively, configured for:
receiving a user operation for continuously moving out of the viewport by causing the selector position on a boundary element of the viewport;
determining first element numbers that correspond to elements in a virtual list in which the boundary element is located according to the user operation;
determining second element numbers that correspond to to-be-displayed elements in the virtual list according to the first element numbers and a direction of the selector moving out of the viewport;
sorting the second element numbers, so that the sorted second element numbers are obtained by replacing the minimum element numbers on the basis of the first element numbers;
updating a virtual list rendered by the elements that correspond to the first element numbers by utilizing the sorted second element numbers, wherein only elements that correspond to element numbers different from the first element numbers are rendered in the sorted second element numbers in response to the virtual list being updated; and
controlling total elements in the updated virtual list to be displayed in the viewport.

2. The display apparatus according to claim 1, wherein the controller is configured for determining the second element numbers that correspond to the to-be-displayed elements on the virtual list in accordance with the first element numbers and the direction of the selector moving out of the viewport by:
moving the selector by m times in response to the virtual list being a horizontal virtual list;
adding m to the first element numbers in response to determining that the selector is not located on the last m elements in the virtual list and the direction of the selector moving out of the viewport is right; and
subtracting m from the first element numbers in response to determining that the selector is not located on the previous m elements in the virtual list and the direction of the selector moving out of the viewport is left.

3. The display apparatus according to claim 1, wherein the controller is configured for determining the second element numbers that correspond to the to-be-displayed elements on the virtual list in accordance with the first element numbers and the direction of the selector moving out of the viewport by:
  moving the selector by w times in response to the virtual list being a vertical virtual list;
  adding w to the first element numbers in response to determining that the selector is not located on the last w elements in corresponding resources of the virtual list and the direction of the selector moving out of the viewport is downward; and
  subtracting w from the first element numbers in response to determining that the selector is not located on the previous w elements in the corresponding resources of the virtual list and the direction of the selector moving out of the viewport is upward.

4. The display apparatus according to claim 1, wherein the controller is configured for sorting the second element numbers by:
  calculating a remainder of the second element numbers according to the number of the second element numbers; and
  arranging the second element numbers according to the remainder to obtain the sorted second element numbers.

5. The display apparatus according to claim 1, wherein the controller is configured for controlling total elements in the updated virtual list to be displayed in the viewport by modifying an outer element style.

6. The display apparatus according to claim 1, wherein the element is a visual object for indicating an icon, a thumbnail, a video clip or a link presented on the user interface.

7. The display apparatus according to claim 1, wherein the user operation is input via the remote control.

8. A viewport display method for a display apparatus, comprising:
  receiving a user operation for continuously moving out of a viewport by causing a selector position on a boundary element of the viewport on a user interface presented on a display of the display apparatus;
  determining first element numbers that correspond to elements in a virtual list in which the boundary element is located according to the user operation;
  determining second element numbers that correspond to to-be-displayed elements on the virtual list according to the first element numbers and the direction of the selector moving out of the viewport;
  sorting the second element numbers, so that the sorted second element numbers are obtained by replacing the minimum element numbers on the basis of the first element numbers;
  updating a virtual list rendered by the elements that correspond to the first element numbers by utilizing the sorted second element numbers, wherein only elements that correspond to element numbers different from the first element numbers are rendered in the sorted second element numbers in response to the virtual list being updated; and
  controlling total elements in the updated virtual list to be displayed in the viewport.

9. The viewport display method according to claim 8, wherein the determining the second element numbers that correspond to the to-be-displayed elements on the virtual list according to the first element numbers and the direction of the selector moving out of the viewport, comprises:
  moving the selector by m times in response to the virtual list being a horizontal virtual list;
  adding m to the first element numbers in response to determining that the selector is not located on the last m elements in the virtual list and the direction of the selector moving out of the viewport is right; and
  subtracting m from the first element numbers in response to determining that the selector is not located on the previous m elements in the virtual list and the direction of the selector moving out of the viewport is left.

10. The viewport display method according to claim 8, wherein the determining the second element numbers that correspond to the to-be-displayed elements on the virtual list according to the first element numbers and the direction of the selector moving out of the viewport, comprises:
  moving the selector by w times in response to the virtual list being a vertical virtual list;
  adding w to the first element numbers in response to determining that the selector is not located on the last w elements in corresponding resources of the virtual list and the direction of the selector moving out of the viewport is downward; and
  subtracting w from the first element numbers in response to determining that the selector is not located on the previous w elements in the corresponding resources of the virtual list and the direction of the selector moving out of the viewport is upward.

11. The viewport display method according to claim 8, wherein the sorting the second element numbers comprises:
  calculating a remainder of the second element numbers according to the number of the second element numbers; and
  arranging the second element numbers according to the remainder to obtain the sorted second element numbers.

12. The viewport display method according to claim 8, further comprising:
  controlling total elements in the updated virtual list to be displayed in the viewport by modifying an outer element style.

13. The viewport display method according to claim 8, wherein the element is a visual object for indicating an icon, a thumbnail, a video clip or a link presented on the user interface.

14. The viewport display method according to claim 8, wherein the user operation is input via the remote control.

* * * * *